US009646282B2

(12) United States Patent
Anderson

(10) Patent No.: US 9,646,282 B2
(45) Date of Patent: May 9, 2017

(54) SYSTEMS, METHODS, AND COMPUTER PROGRAM PRODUCTS FOR IMPLEMENTING A PRECISION RATE STRUCTURE ACROSS ONE OR MORE GEOGRAPHICAL AREAS

(71) Applicant: United Parcel Service of America, Inc., Atlanta, GA (US)

(72) Inventor: Duane E Anderson, Midlothian, VA (US)

(73) Assignee: United Parcel Service of America, Inc., Atlanta, GA (US)

( * ) Notice: Subject to any disclaimer, the term of this patent is extended or adjusted under 35 U.S.C. 154(b) by 810 days.

(21) Appl. No.: 13/828,806

(22) Filed: Mar. 14, 2013

(65) Prior Publication Data

US 2014/0279300 A1    Sep. 18, 2014

(51) Int. Cl.
*G06Q 20/00*      (2012.01)
*G06Q 10/08*      (2012.01)

(52) U.S. Cl.
CPC ............................ *G06Q 10/08345* (2013.01)

(58) Field of Classification Search
None
See application file for complete search history.

(56) References Cited

U.S. PATENT DOCUMENTS

| | | | | |
|---|---|---|---|---|
| 5,953,427 A * | 9/1999 | Cordery | ............. | G07B 17/0008 380/51 |
| 7,542,972 B2 * | 6/2009 | Owens | .............. | G06F 17/30241 705/400 |
| 8,214,313 B1 * | 7/2012 | Puskorius | ............ | G06Q 10/087 706/28 |
| 2002/0124015 A1 * | 9/2002 | Cardno | .................. | G06Q 30/02 |
| 2002/0178074 A1 * | 11/2002 | Bloom | ................... | G06Q 10/08 705/26.81 |
| 2004/0215480 A1 * | 10/2004 | Kadaba | ..................... | B07C 3/00 705/338 |
| 2008/0133659 A1 * | 6/2008 | Aldrey | .............. | G06Q 30/0601 709/204 |
| 2008/0291033 A1 * | 11/2008 | Aghassipour | .......... | G06Q 10/08 340/584 |
| 2010/0217550 A1 * | 8/2010 | Crabtree | ............. | H02J 13/0079 702/62 |

(Continued)

*Primary Examiner* — Fateh M Obaid
(74) *Attorney, Agent, or Firm* — Alston & Bird LLP

(57) ABSTRACT

Various embodiments provide a rate structuring system for determining a rate adjustment for at least one service point within a geographical area. In certain embodiments, the system comprises one or more computer processors configured to: receive service point data comprising one or more real-time observed characteristics associated with delivery of at least one package to one or more of said at least one service points within said geographical area; retrieve rate data; calculate at least one of cost data and profit data for each service point associated with said received service point data; compare said calculated cost/profit data against one or more parameters; and in response to at least a portion of said calculated data differing from said one or more parameters, generate rate adjustment instructions, said instructions being configured for implementation of an adjustment to said rate data. Associated computer program products and computer implemented methods are also provided.

25 Claims, 18 Drawing Sheets

(56) References Cited

U.S. PATENT DOCUMENTS

| | | | |
|---|---|---|---|
| 2010/0218108 A1* | 8/2010 | Crabtree | G06Q 50/06 715/738 |
| 2010/0332373 A1* | 12/2010 | Crabtree | G06Q 50/06 705/37 |
| 2013/0173402 A1* | 7/2013 | Young | G06Q 30/0631 705/14.73 |
| 2015/0094968 A1* | 4/2015 | Jia | G06Q 40/04 702/60 |

* cited by examiner

Example boundary of existing geographical rate unit (e.g., a postal code boundary)
Average OR = 0.95

Measuring costs within the postal code, we discover varying profits.
OR=1.05
OR=0.91

We change our rates based upon variances in profits identified.
OR=0.95 Rate
OR=0.92 Rate

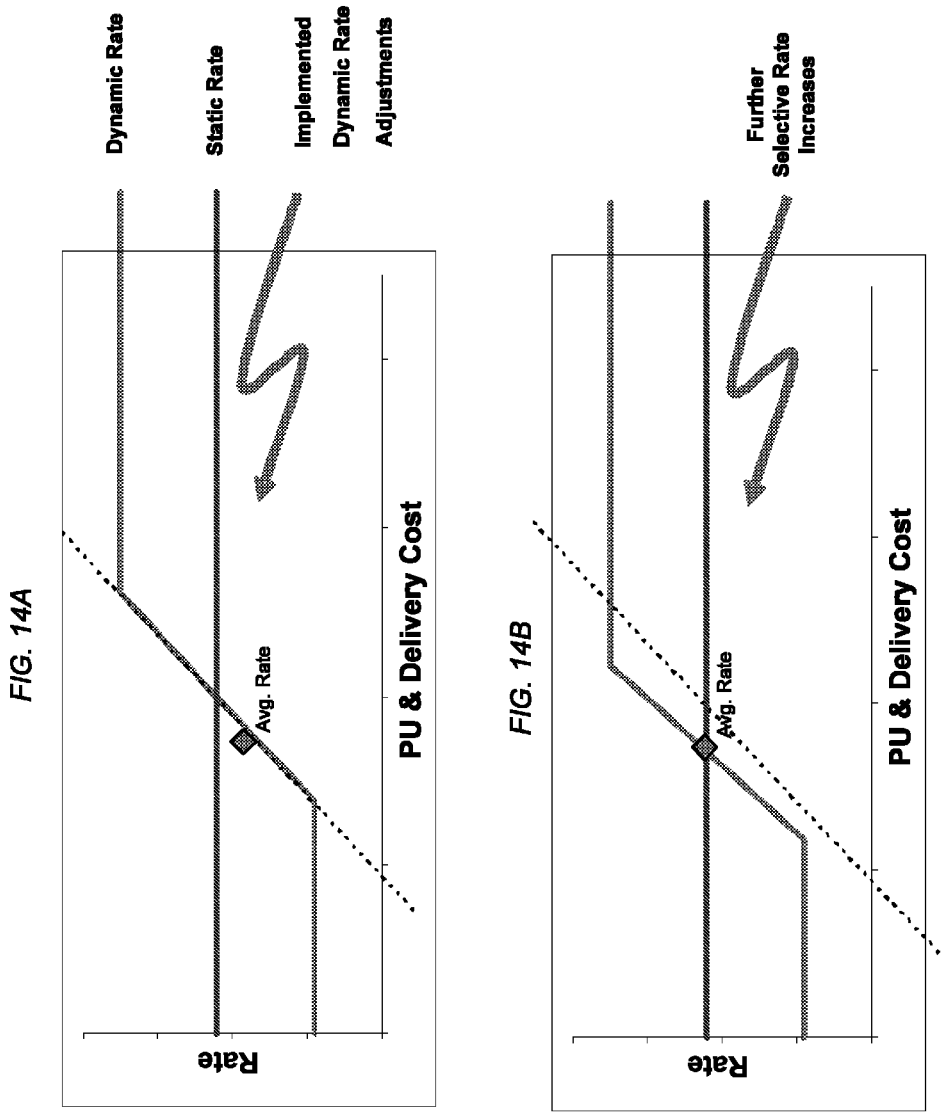

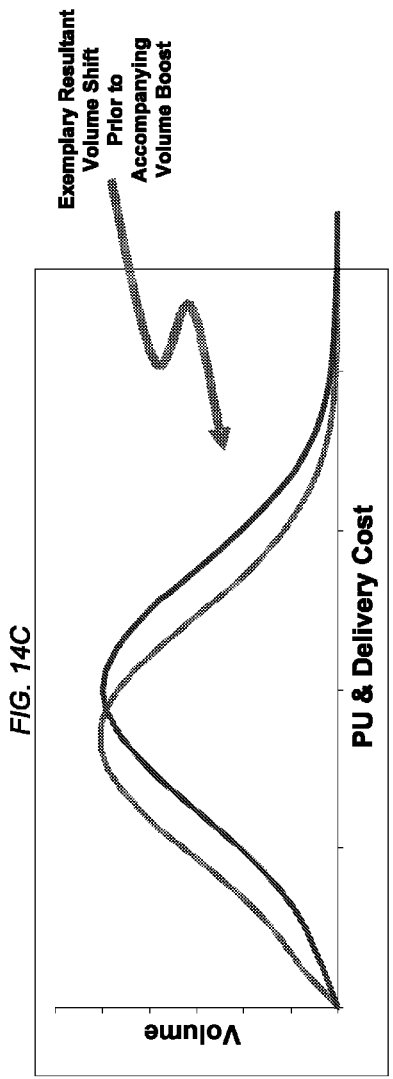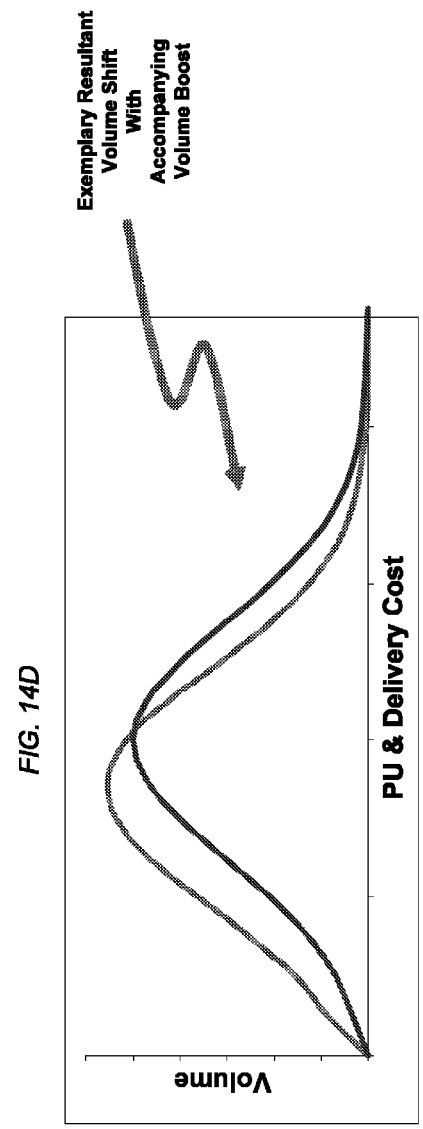

SYSTEMS, METHODS, AND COMPUTER PROGRAM PRODUCTS FOR IMPLEMENTING A PRECISION RATE STRUCTURE ACROSS ONE OR MORE GEOGRAPHICAL AREAS

BACKGROUND

Shipping carriers (e.g., common carriers, such as United Parcel Service, Inc. (UPS), FedEx, United States Postal Service (USPS), etc.) daily transport millions of packages over tens of thousands of routes to and from a variety of clients for a variety of different purposes. Generally, shipping carriers structure rates for the shipment of these packages on the basis of discrete and pre-defined geographical areas. Historically, geographical areas are defined with a granularity level the size of postal or zip codes. As a result, packages destined for a particular postal or zip code are assigned an identical rate structure.

Using conventional rate structuring systems, differing costs for each package destined for a particular postal or zip code do not influence the rate structure applied thereto. Instead, costs and profits are averaged across the postal or zip code. As a result, certain packages within the postal or zip code, namely those with a higher static cost of delivery, become less profitable, as compared to those packages having a lower static cost of delivery. namely those configured with rate structures associated with postal or zip codes defining geographical destination areas, all packages destined for a particular postal or zip code are assigned the same rate structure, regardless of differing costs associated with the delivery of individual packages within that postal or zip code. Differing profits margins also occur, on a package-level basis, due to the existing degree of granularity within conventional rate structuring systems. As a result, delivery of certain packages is more costly and/or less profitable for the shipping carrier than others, which is generally a less than desirable model.

Accordingly, a need exists to provide a rate structuring system that defines geographical destination areas with sufficient granularity so as to positively influence profitability on a package-level basis.

BRIEF SUMMARY

According to various embodiments of the present invention, a rate structuring system is provided for determining a rate adjustment for at least one service point within a geographical area. The system comprises: one or more memory storage areas containing at least rate data and one or more parameters, the rate data comprising an existing rate for delivery of packages within the geographical area; and one or more computer processors. The one or more computer processors are configured to: receive service point data, the service point data comprising one or more real-time observed characteristics associated with delivery of at least one package to one or more of the at least one service points within the geographical area; retrieve at least a portion of the rate data contained in the one or more memory storage areas; calculate at least one of cost data and profit data for each service point associated with the received service point data; compare the calculated at least one of cost data and profit data against the one or more parameters contained in the one or more memory storage areas; and in response to at least a portion of the calculated data differing from the one or more parameters, generate rate adjustment instructions, the instructions being configured for implementation of an adjustment to the rate data.

According to various embodiments of the present invention, a non-transitory computer program product is provided comprising at least one computer-readable storage medium having computer-readable program code portions embodied therein. The computer-readable program code portions comprise: (A) a first executable portion configured for receiving and storing a plurality of data, wherein the data comprises: (i) rate data comprising an existing rate for delivery of packages within the geographical area; (ii) one or more pre-determined parameters associated with the geographical area; and (iii) service point data comprising one or more real-time observed characteristics associated with delivery of at least one package to one or more of the at least one service points within the geographical area; (B) a second executable portion configured for calculating at least one of cost data and profit data for each service point associated with the received service point data; (C) a third executable portion configured for comparing the calculated at least one of cost data and profit data against the one or more pre-determined parameters; and (D) a fourth executable portion configured for, in response to at least a portion of the calculated data differing from the one or more parameters, generating rate adjustment instructions, the instructions being configured for implementation of an adjustment to the rate data.

According to various embodiments of the present invention, a computer-implemented method is provided for determining a rate adjustment for at least one service point within a geographical area. Various embodiments of the method comprise the steps of: receiving and storing service point data within one or more memory storage areas, the service point data comprising one or more real-time observed characteristics associated with delivery of at least one package to one or more of the at least one service points within the geographical area; retrieving from the one or more memory storage areas at least a portion of existing rate data, the existing rate data comprising an existing rate for delivery of packages within the geographical area; calculating, via at least one computer processor, at least one of cost data and profit data for each service point associated with the received service point data; comparing, via the at least one computer processor, the calculated at least one of cost data and profit data against one or more parameters contained in the one or more memory storage areas; and in response to at least a portion of the calculated data differing from the one or more parameters, generate rate adjustment instructions, the instructions being configured for implementation of an adjustment to the rate data.

BRIEF DESCRIPTION OF THE SEVERAL VIEWS OF THE DRAWING(S)

The accompanying drawings incorporated herein and forming a part of the disclosure illustrate several aspects of the present invention and together with the detailed description serve to explain certain principles of the present invention. In the drawings, which are not necessarily drawn to scale:

Figure 2:
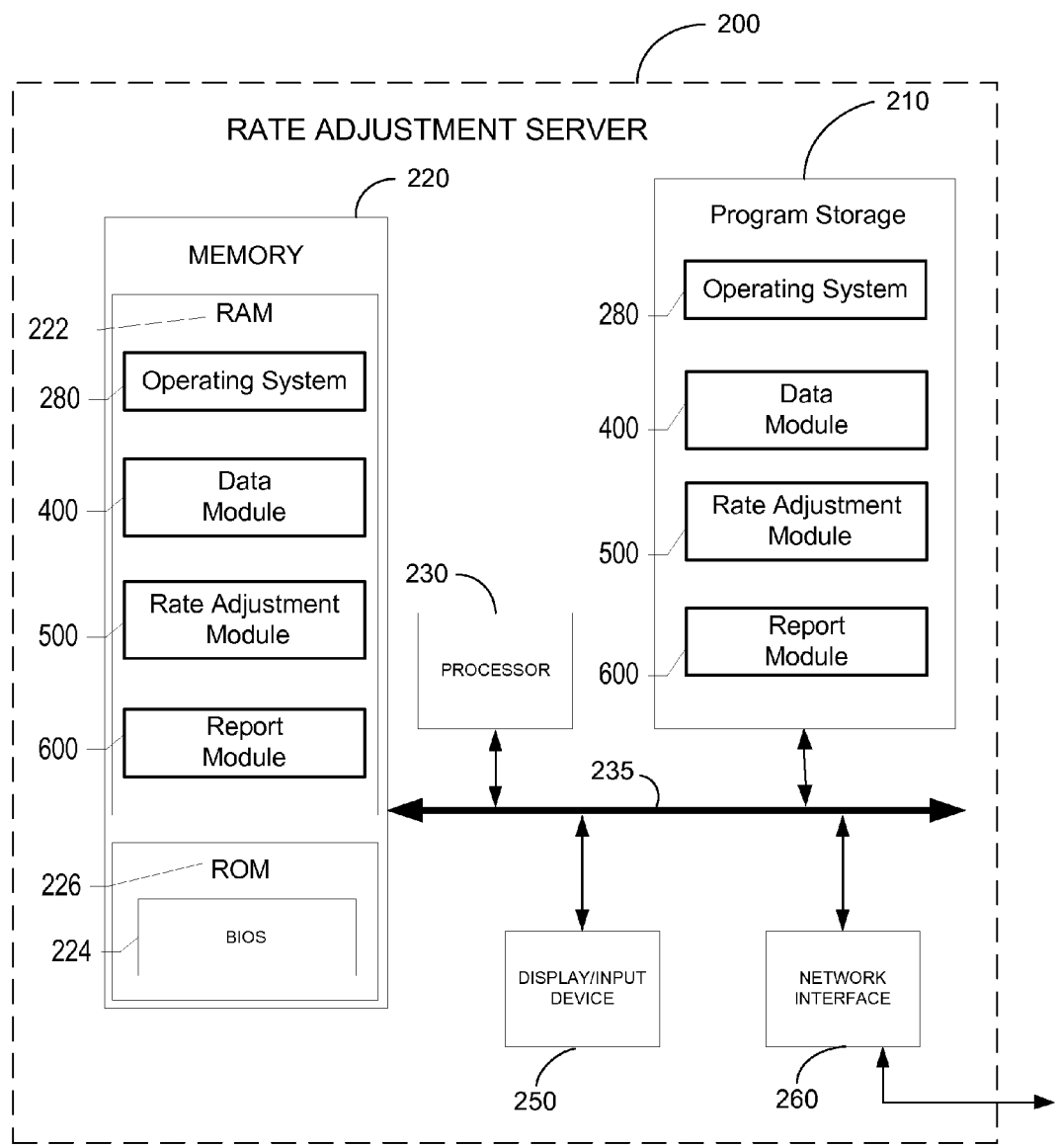
FIG. 2 is schematic block diagram of a rate adjustment server 200 according to various embodiments.
Figure 3:
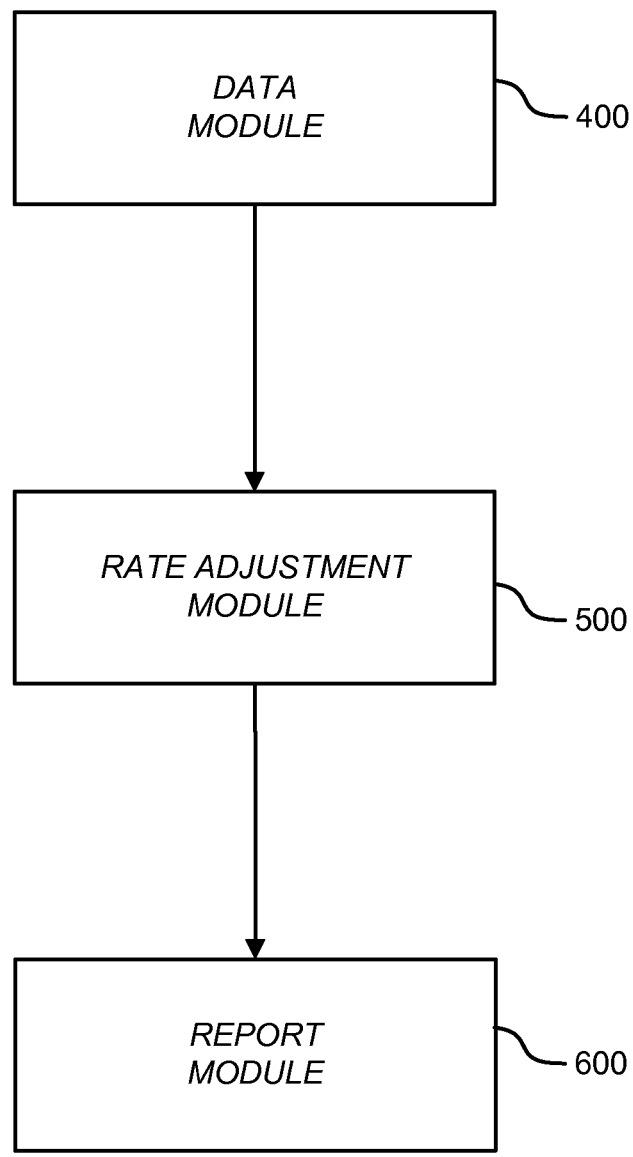
FIG. 3 illustrates an overall process flow for various modules of the rate adjustment server 200 according to various embodiments.
Figure 5:
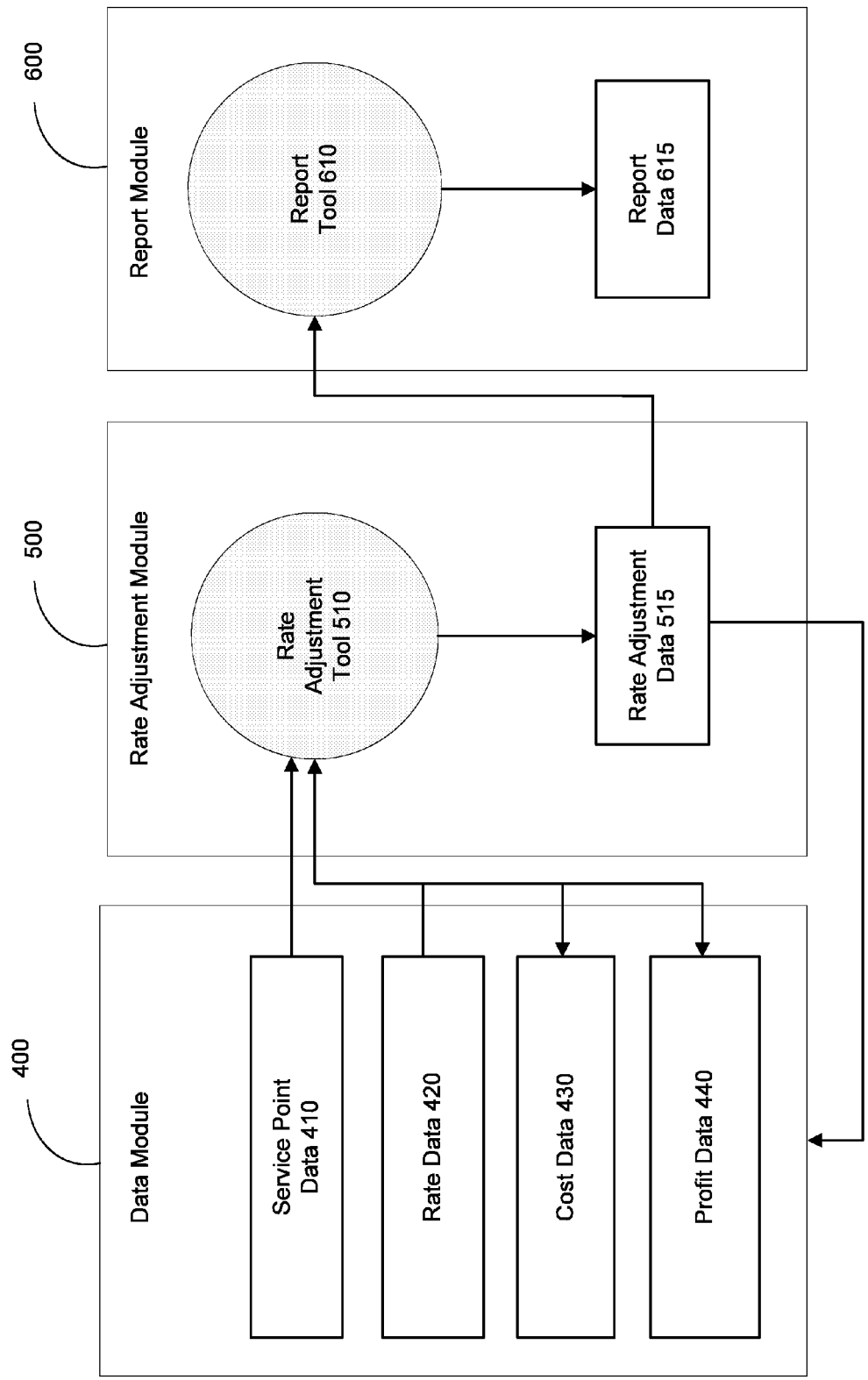
Figure 6:
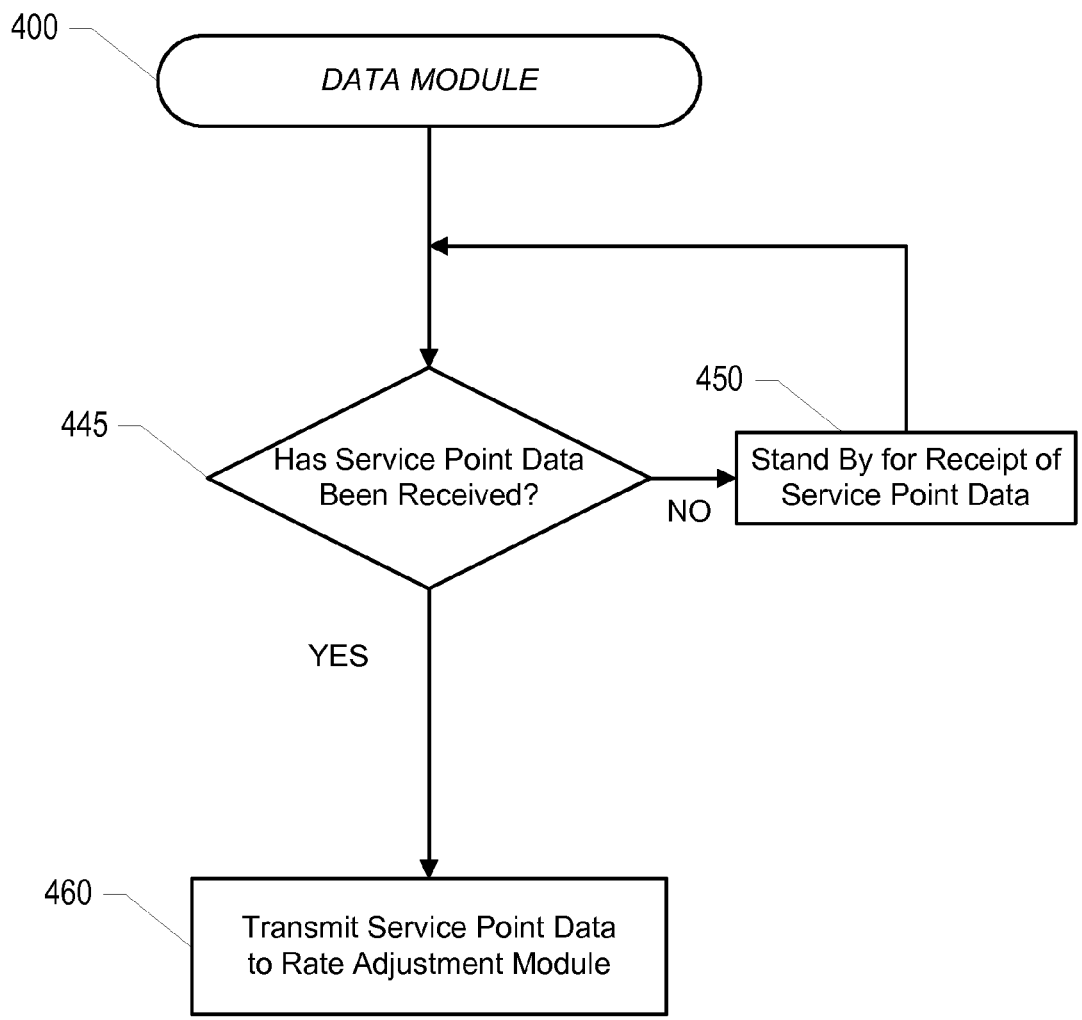
Figure 7:
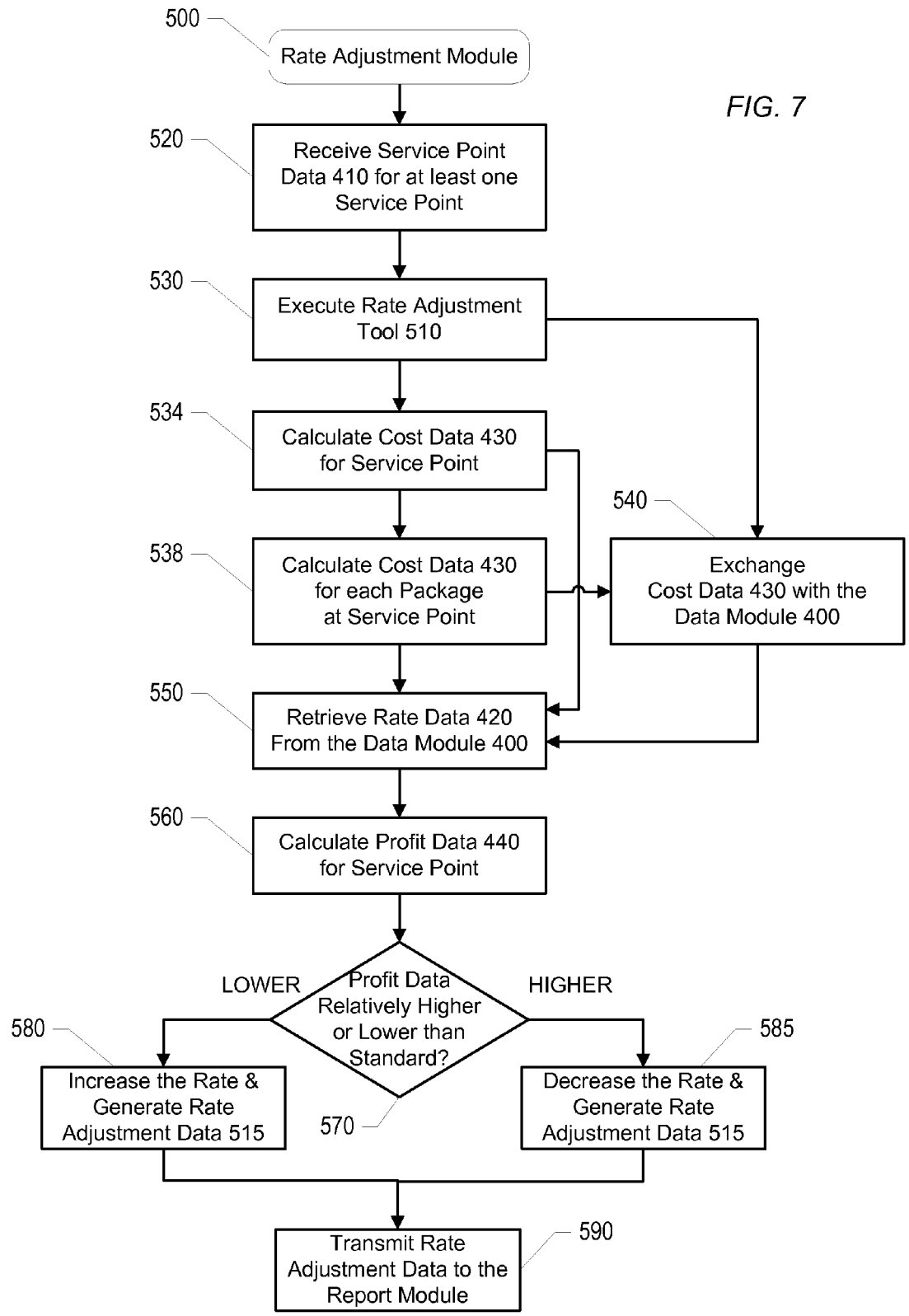
Figure 8:
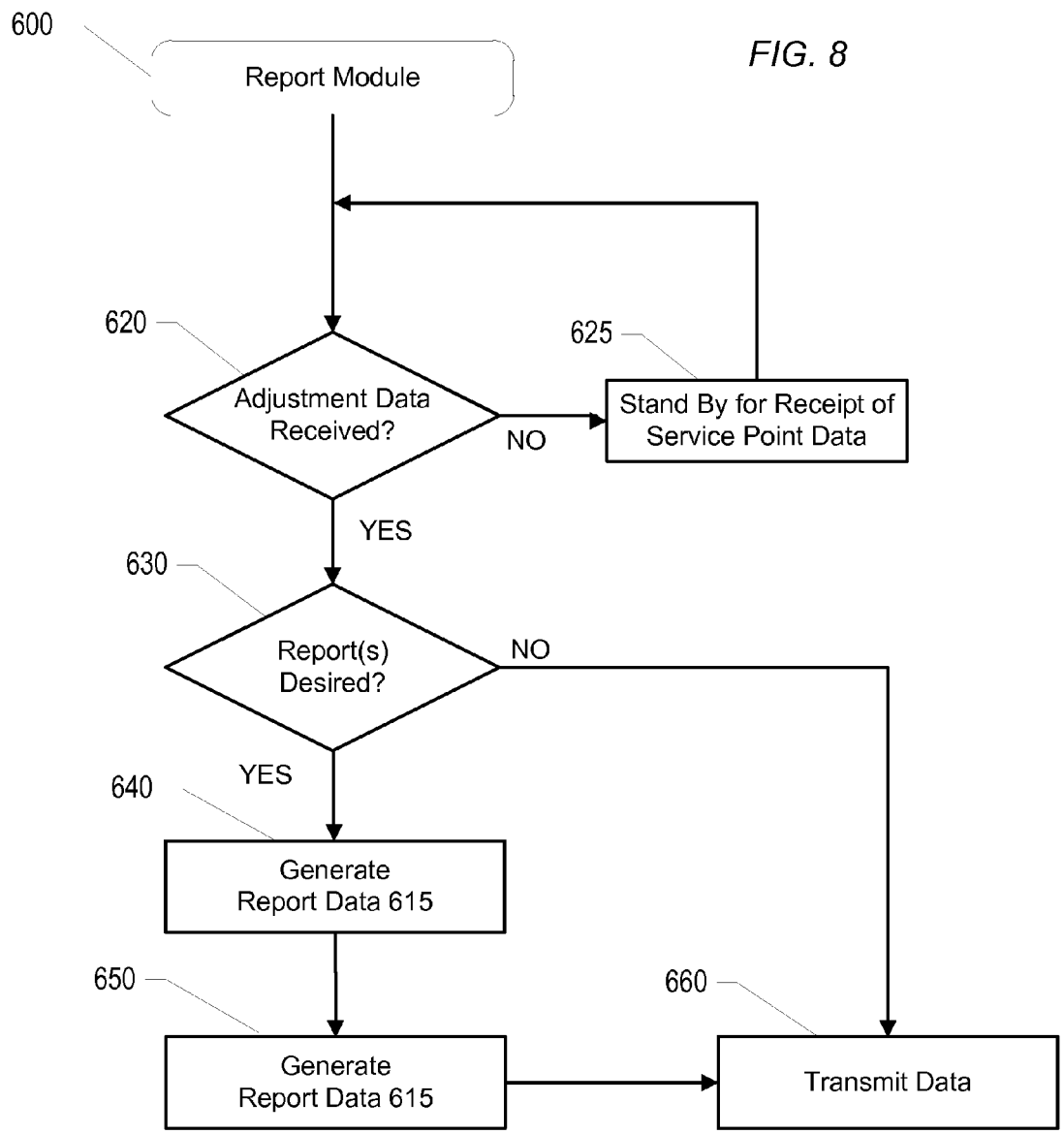
Figure 9:
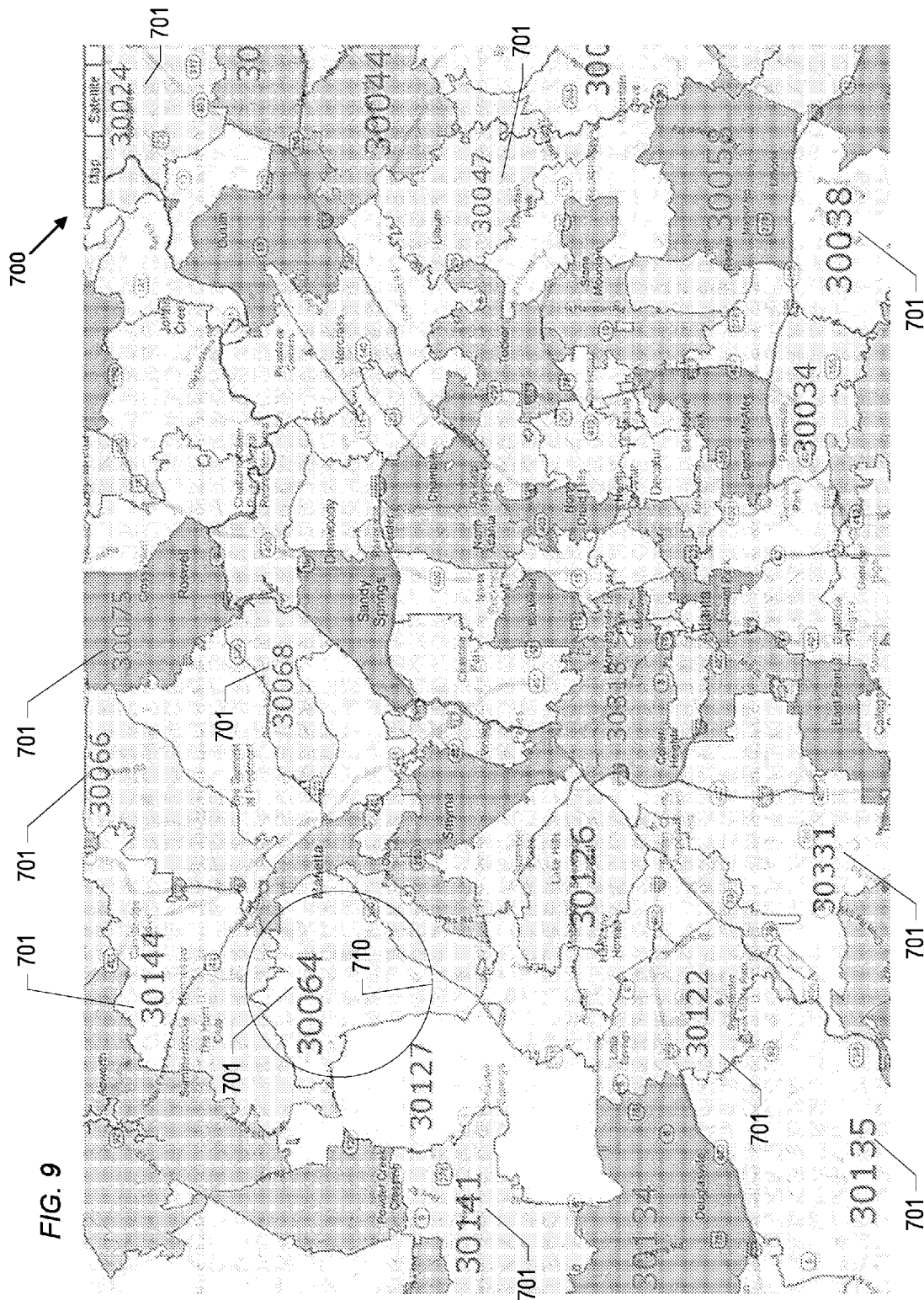
Figure 10:
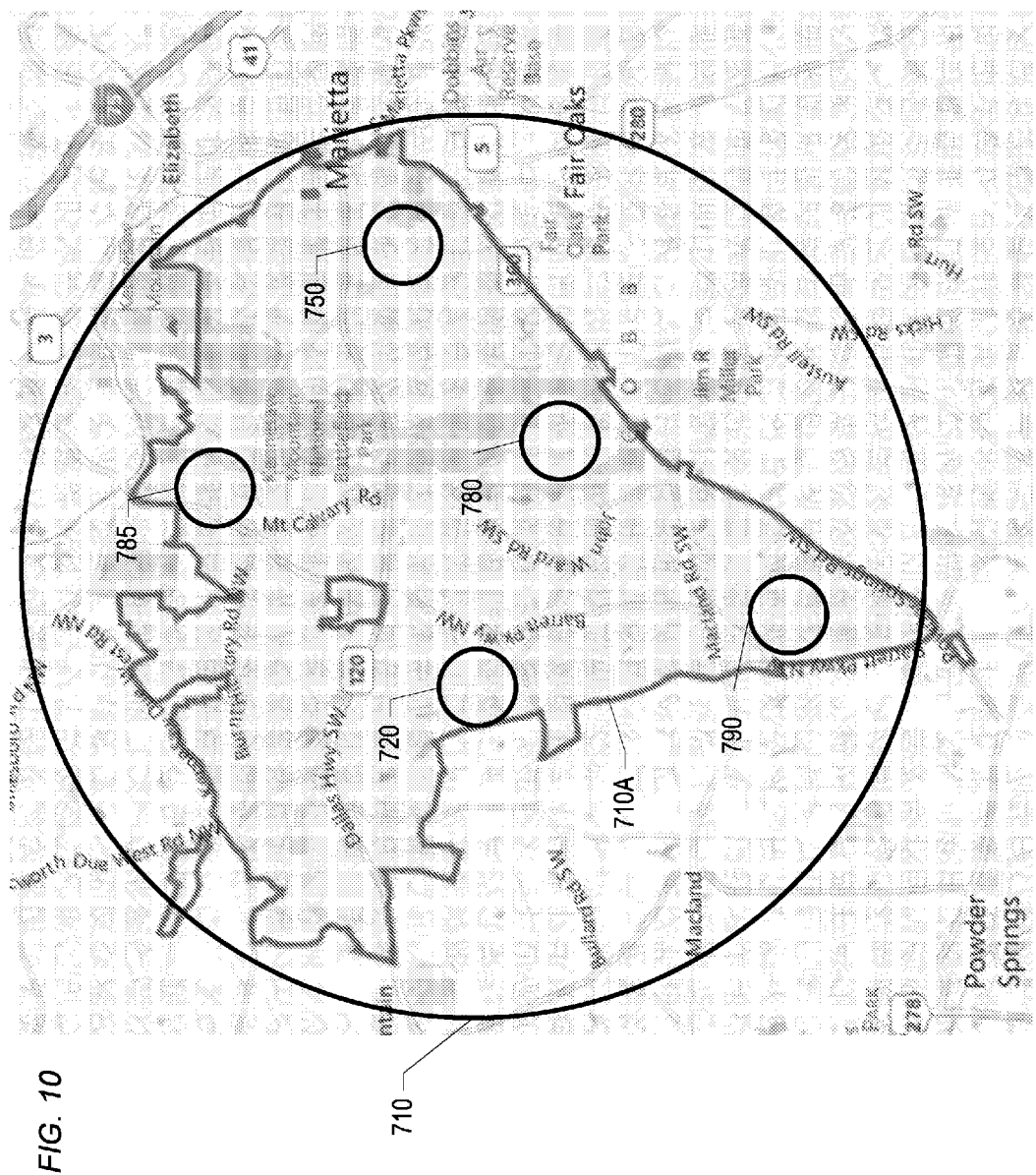
Figure 11:
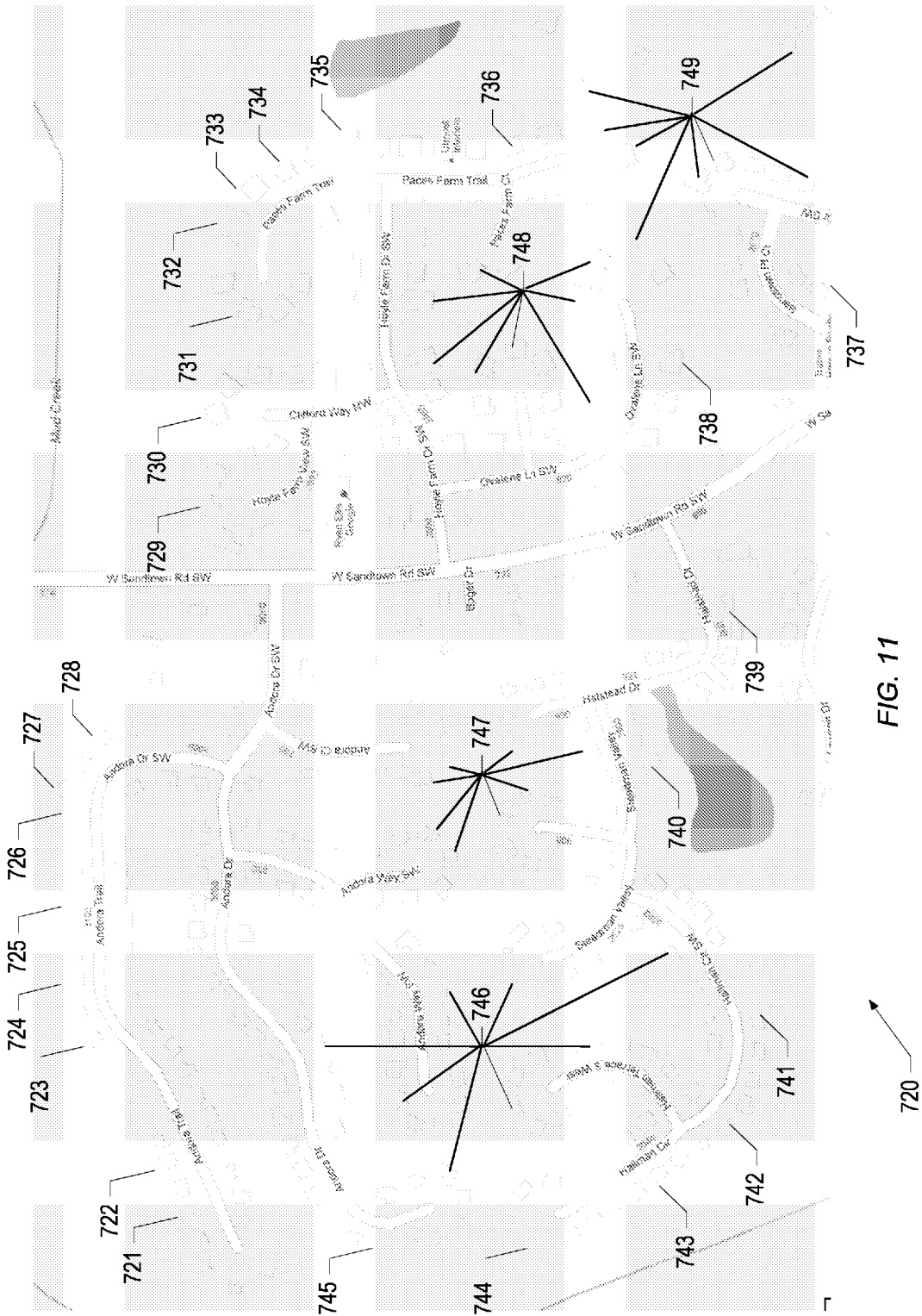
Figure 12:
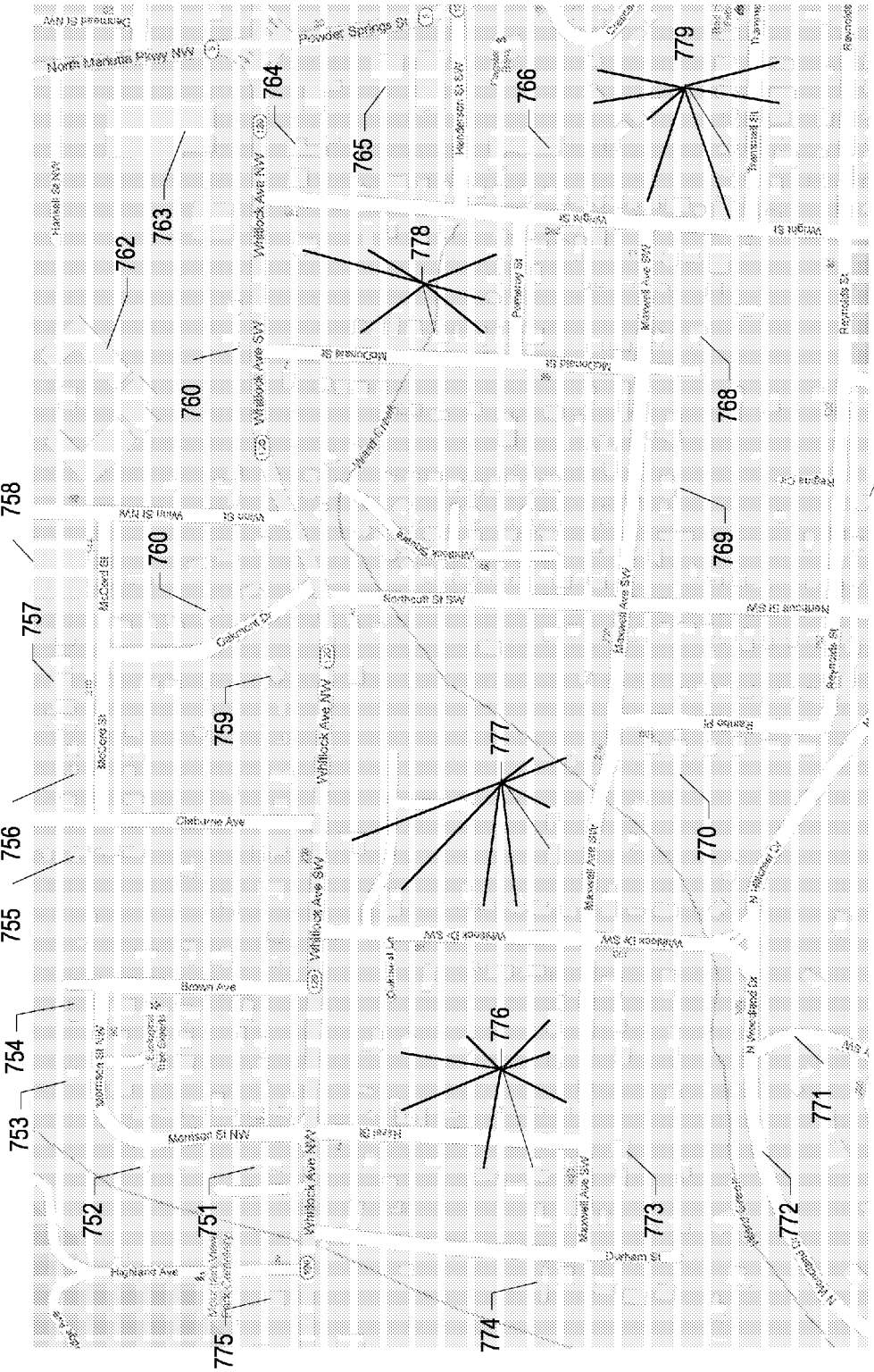
Figure 13A:
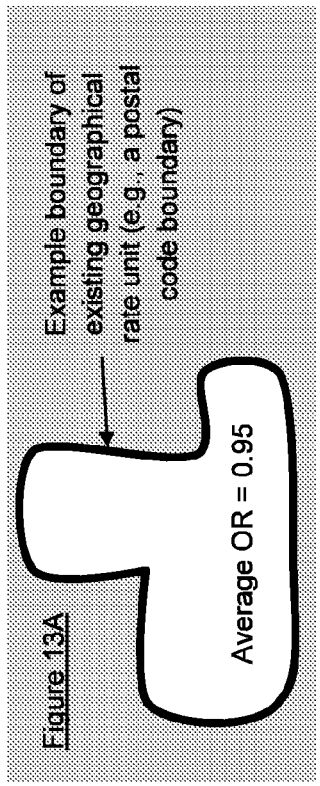
Figure 13B:
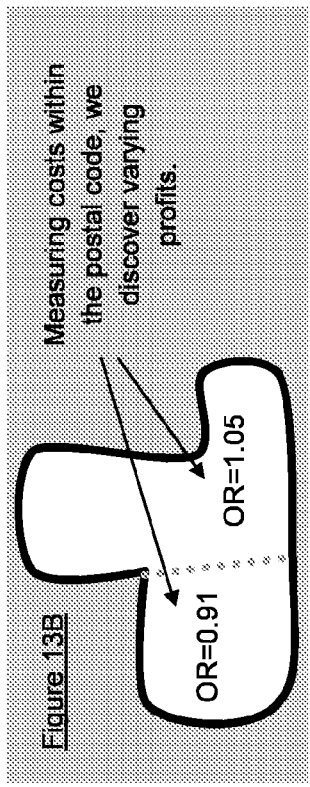
Figure 13C:
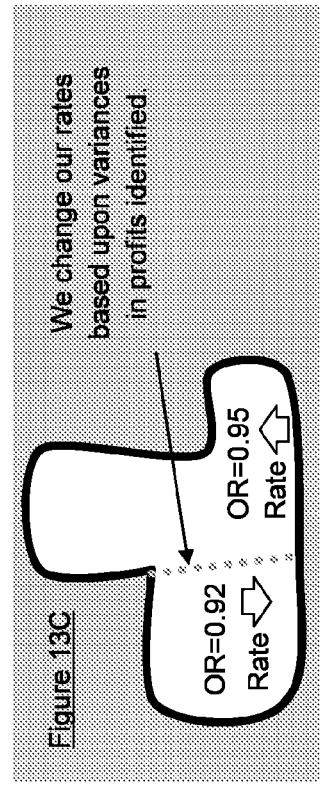
Figure 14E:
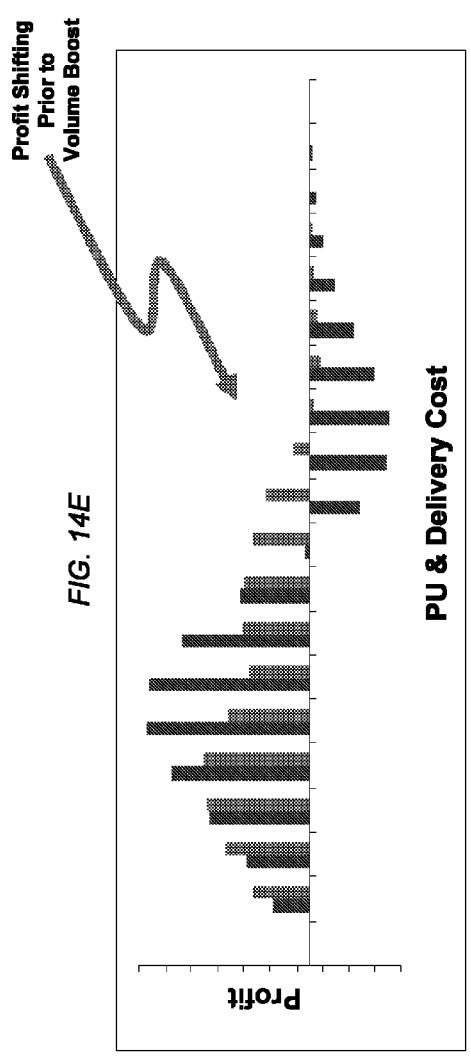
Figure 14F:
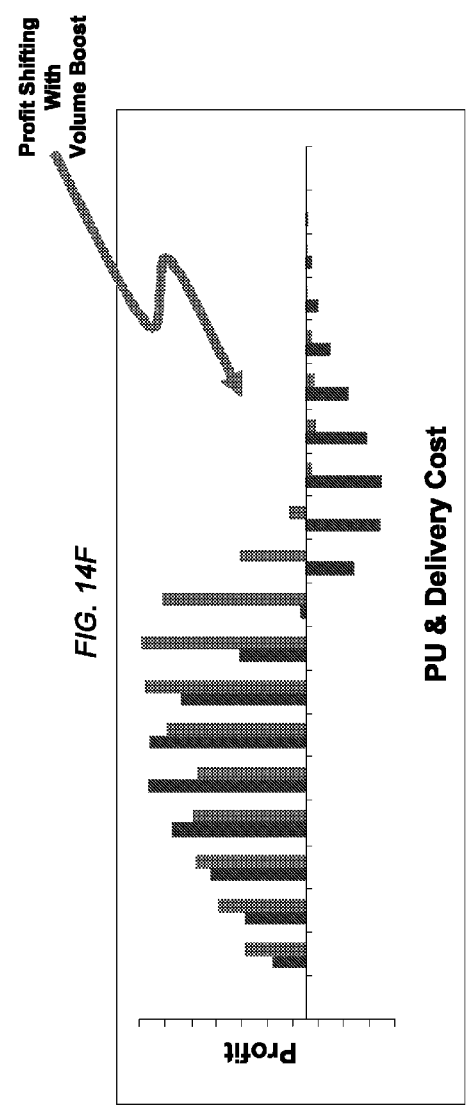
Figures 14G, 14H:
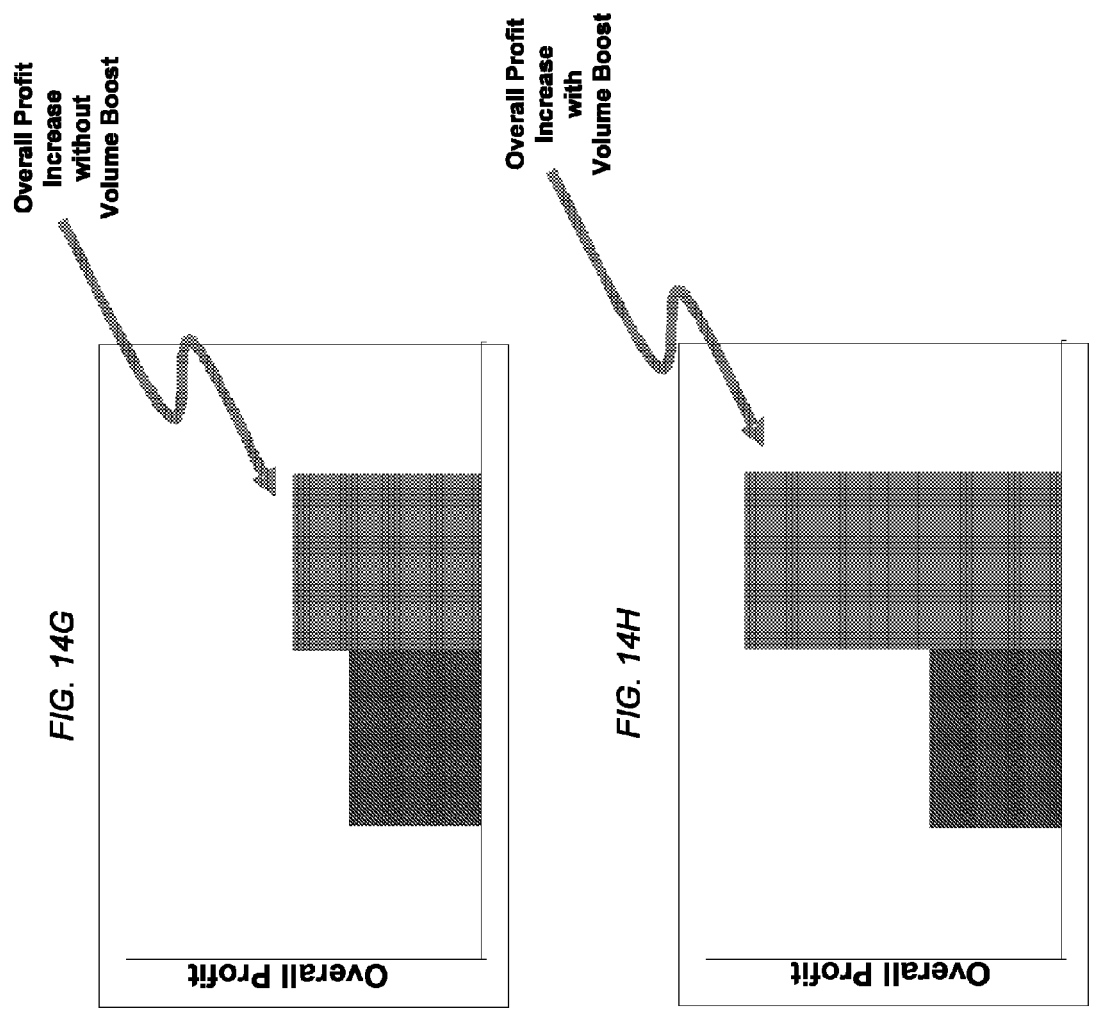
Figure 15:
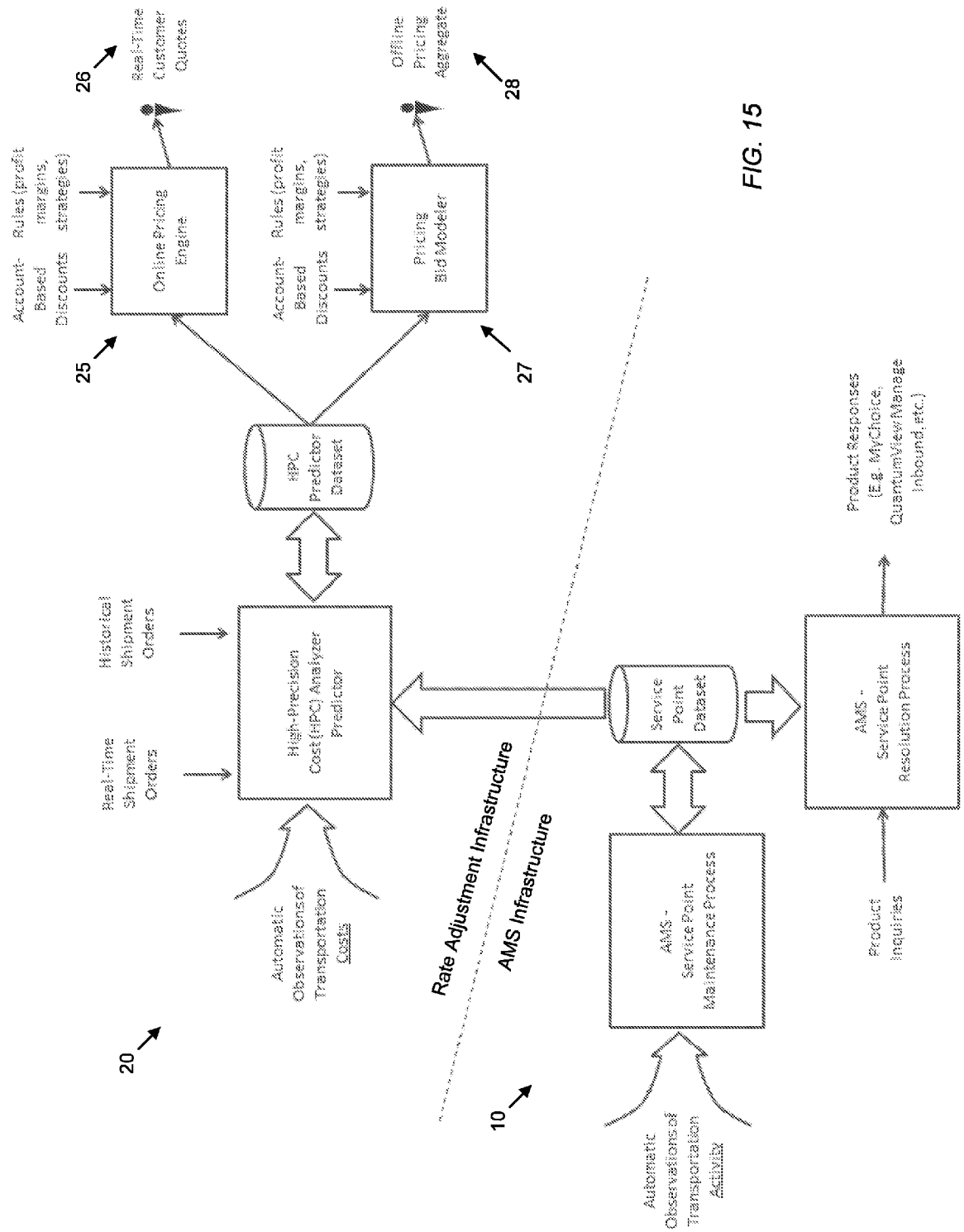

FIG. 5 is a schematic block diagram of a data module 400, a rate adjustment module 500, and a report module 600, as also illustrated in FIGS. 2 and 3 according to various embodiments;

FIG. 6 illustrates an exemplary process flow according to various embodiments for the data module 400 shown in FIGS. 2 and 5;

FIG. 7 illustrates an exemplary process flow according to various embodiments for the rate adjustment module 500 shown in FIGS. 2 and 5;

FIG. 8 illustrates an exemplary process flow according to various embodiments for the report module 600 shown in FIGS. 2 and 5;

FIG. 9 illustrates an exemplary geographical area map 700, further illustrating a plurality of geographical rate units 701 from which rate data 420 may be derived according to various embodiments;

FIG. 10 illustrates an exemplary geographical rate unit 710 within the exemplary geographical area map 700 of FIG. 9, further illustrating a plurality of exemplary sub-areas 720, 750, 780, 785, 790, as may be defined therein according to various embodiments;

FIG. 11 illustrates a plurality of service points 721-749, as may be further defined according to various embodiments within exemplary sub-area 720;

FIG. 12 illustrates a plurality of service points 751-779, as may be further defined according to various embodiments within exemplary sub-area 730;

FIGS. 13A-C illustrate an exemplary graphic process flow according to various embodiments for the rate adjustment module 500, as a corollary to the exemplary textual process flow of FIG. 7;

FIGS. 14A-H illustrate various exemplary charts, as may be generated according to various embodiments by the report module 600; and FIG. 15 illustrates a block diagram of a rate structuring system 20 according to various embodiments

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Apparatuses, Methods, Systems, and Computer Program Products

Embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory, multimedia memory cards (MMC), secure digital (SD) memory cards, Memory Sticks, and/or the like. Further, a non-volatile computer-readable storage medium may also include conductive-bridging random access memory (CBRAM), phase-change random access memory (PRAM), ferroelectric random-access memory (FeRAM), resistive random-access memory (RRAM), Silicon-Oxide-Nitride-Oxide-Silicon memory (SONOS), racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Rambus in-line memory module (RIMM), dual in-line memory module (DIMM), single in-line memory module (SIMM), video random access memory VRAM, cache memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations, respectively, may be implemented in the form of a computer program product, an entirely hardware embodiment, a combination of hardware and computer program products, and/or apparatus, systems, computing devices, computing entities, and/or the like carrying out instructions on a computer-readable storage medium for execution. Such embodiments can produce specifically-configured machines performing the steps or operations specified in the block diagrams and flowchart illustrations. Accordingly, the block diagrams and flowchart illustrations support various combinations of embodiments for performing the specified steps or operations.

Exemplary System Architecture

Figure 1:
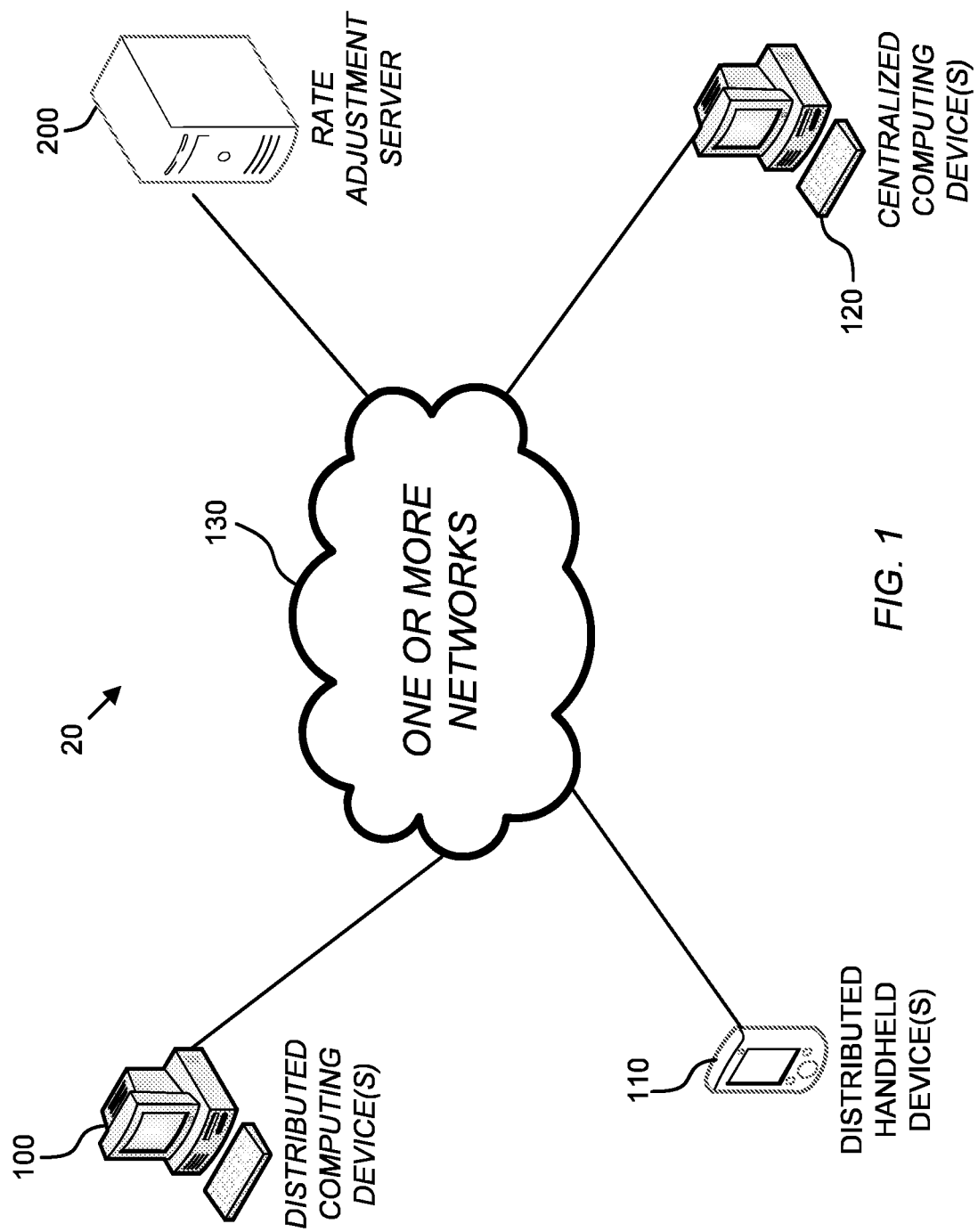
FIG. 1 is a block diagram of a rate structuring system 20 according to various embodiments.

FIG. 1 is a block diagram of a rate structuring system 20 that can be used in conjunction with various embodiments of the present invention. In at least the illustrated embodiment, the rate structuring system 20 may include one or more distributed computing devices 100, one or more distributed handheld devices 110, and one or more central computing devices 120, each configured in communication with a rate adjustment server 200 via one or more networks 130. While FIG. 1 illustrates the various system entities as separate, standalone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like. Still other alternatives include the non-limiting examples of Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol.

Although the distributed computing device(s) 100, the distributed handheld device(s) 110, the central computing device(s) 120, and the rate adjustment server 200 are illustrated in FIG. 1 as communicating with one another over the same network 130, these devices may likewise communicate over multiple, separate networks. For example, while the central computing devices 120 may communicate with the server 200 over a wireless personal area network (WPAN) using, for example, Bluetooth techniques, one or more of the distributed devices 100, 110 may communicate with the server 200 over a wireless wide area network (WWAN), for example, in accordance with EDGE, or some other 2.5G wireless communication protocol.

According to one embodiment, in addition to receiving data from the server 200, the distributed computing devices 100, the distributed handheld devices 110, and the central computing devices 120 may be further configured to collect and transmit data on their own. Indeed, the distributed computing devices 100, the distributed handheld devices 110, and the central computing devices 120 may be any device associated with a carrier (e.g., a common carrier, such as UPS, FedEx, USPS, etc.). In certain embodiments, one or more of the distributed computing devices 100 and the distributed handheld devices 110 may be associated with an independent third party user, as opposed to a carrier. Regardless, in various embodiments, the distributed computing devices 100, the distributed handheld devices 110, and the central computing devices 120 may be capable of receiving data via one or more input units or devices, such as a keypad, touchpad, barcode scanner, radio frequency identification (RFID) reader, interface card (e.g., modem, etc.) or receiver. The distributed computing devices 100, the distributed handheld devices 110, and the central computing devices 120 may further be capable of storing data to one or more volatile or non-volatile memory modules (as described previously herein), and outputting the data via one or more output units or devices, for example, by displaying data to the user operating the device, or by transmitting data, for example over the one or more networks 130. One type of a distributed handheld device 110, which may be used in conjunction with embodiments of the present invention is the Delivery Information Acquisition Device (DIAD) presently utilized by the United Parcel Service, Inc. (UPS).

Rate Adjustment Server 200

In various embodiments, the rate adjustment server 200 includes various components for performing one or more functions in accordance with various embodiments of the present invention, including those more particularly shown and described herein. It should be understood, however, that the rate adjustment server 200 might include a variety of alternative devices for performing one or more like functions, without departing from the spirit and scope of the present invention. For example, at least one or more components of the rate adjustment server 200, in certain embodiments, may be located on the distributed computing device(s) 100, the distributed handheld device(s) 110, and the central computing device(s) 120, as may be desirable for particular applications.

FIG. 2 is a schematic diagram of the rate adjustment server 200 according to various embodiments. The server 200 includes a processor 230 that communicates with other elements within the server via a system interface or bus 235. Also included in the server 200 is a display/input device 250 for receiving and displaying data. This display/input device 250 may be, for example, a keyboard or pointing device that is used in combination with a monitor. The server 200 further includes memory 220, which preferably includes both read only memory (ROM) 226 and random access memory (RAM) 222. The server's ROM 226 is used to store a basic input/output system 224 (BIOS), containing the basic routines that help to transfer information between elements within the server 200. The server's ROM 226 may include one or more non-volatile storage or memory media such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. The server's RAM 222 may include one or more volatile storage or memory media such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like.

In addition, the rate adjustment server 200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for a personal computer. As will be appreciated by one of ordinary skill in the art, the computer-readable media described above could be replaced by any other type of computer-readable media known in the art. Such media include the non-limiting examples of magnetic cassettes, flash memory cards, digital video disks, and Bernoulli cartridges.

Although not shown, according to an embodiment, the storage device 210 and/or memory of the rate adjustment server 200 may further provide the functions of a data storage device, which may store historical and/or current delivery data and delivery conditions that may be accessed by the server 200. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules comprising, for example, one or more computer-readable program code portions executable by the processor 230, may be stored by the various storage devices 210 and within RAM 222. Such program modules include an operating system 280, a data module 400, a rate adjustment module 500, and a report module 600. In these and other embodiments, the various modules 400, 500, 600 control certain aspects of the operation of the server 200 with the assistance of the processor 230 and operating system 280. In still other embodiments, it should be understood that one or more additional and/or alternative modules may also be provided, without departing from the scope and nature of the present invention.

In general, as will be described in further detail below, the data module 400 is configured to receive, store, manage, and transmit service point data 410, rate data 420, cost data 430, and profit data 440 (see FIG. 5). According to various embodiments, the data module 400 is configured to provide at least the service point data 410 to the rate adjustment module 500, whether proactively or upon request therefor. Upon receipt and/or retrieval of data, the rate adjustment module 500 is configured to activate and execute a rate adjustment tool 510 (see FIG. 5). The rate adjustment tool 510 is configured to determine an adjusted rate for each service point within a geographical area, based at least in part upon the service point data 410. In certain embodiments, the adjusted rate is further based upon cost data 430, (existing) rate data 420, and profit data 440, all as may be either retrieved from the data module or calculated by the tool 510, however may be desirable for particular applications, as will all be described in further detail below. Upon receiving indication or notification of one or more rate adjustments, the report module 600 is configured to determine whether one or more reports are appropriate, as may be determined according to particular applications. If so, the reports, which may comprise conventional reports, charts, graphs, notifications, alerts, and the like, may be generated and/or transmitted by the report module 600. All of these features and still further details surrounding the operation and configuration of the various modules 400, 500, and 600 will be described in further detail later herein.

In various embodiments, the program modules 400, 500, 600 are executed by the rate adjustment server 200 and are configured to generate one or more graphical user interfaces, reports, instructions, and/or notifications/alerts, all accessible and/or transmittable to various users of the system 20. In certain embodiments, the user interfaces, reports, instructions, and/or notifications/alerts may be accessible via one or more networks 130, which may include the Internet or other feasible communications network, as previously discussed. In other embodiments, one or more of the modules 400, 500, 600 may be alternatively and/or additionally (e.g., in duplicate) stored locally on one or more of the distributed computing devices 100, the distributed handheld devices 110, and/or the central computing devices 120, and may be executed by one or more processors of the same. According to various embodiments, the modules 400, 500, 600 may send data to, receive data from, and utilize data contained in, one or more databases, which may be comprised of one or more separate, linked and/or networked databases.

According to various embodiments, the one or more graphical user interfaces (that can include a display 250 coupled to a processing element 230) may comprise any of a number of devices allowing the user computing entity 105 to receive data, such as a keypad 318 (hard or soft), a touch display, voice or motion interfaces, or other input device. In embodiments including a keypad 318, the keypad 318 can include (or cause display of) the conventional numeric (0-9) and related keys (#, *), and other keys used for operating the user computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

Also located within the rate adjustment server 200 is a network interface 260 for interfacing and communicating with other elements of the one or more networks 130. It will be appreciated by one of ordinary skill in the art that one or more of the server 200 components may be located geographically remotely from other server components. Furthermore, one or more of the server 200 components may be combined, and/or additional components performing functions described herein may also be included in the server.

While the foregoing describes a single processor 230, as one of ordinary skill in the art will recognize, the rate adjustment server 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface. The user input interface, in turn, can comprise any of a number of devices allowing the entity to receive data from a user, such as a keypad, a touch display, a joystick or other input device.

While reference is made to the "server" 200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 200 may likewise be used without departing from the spirit and scope of embodiments of the present invention.

According to various embodiments, many individual steps of a process may or may not be carried out utilizing the computer systems and/or servers described herein, and the degree of computer implementation may vary.

Rate Adjustment Server 200 Logic Flow

Reference is now made to FIGS. 3-8, which illustrate various logical process flows executed by various embodiments of the modules described above. In particular, FIG. 3 illustrates the overall relationship of the modules 400, 500, 600 of the transportation network rate adjustment server 200, according to various embodiments. As illustrated, operation of the system 20 begins, according to various embodiments, with the execution of the data module 400, which is configured to receive, store, manage, and service point data 410, rate data 420, cost data 430, and profit data 440 (see FIG. 5). The rate adjustment module 500 is generally configured according to various embodiments to execute at least one tool configured to determine an adjusted rate for each service point within a geographical area, based at least in part upon the service point data 410. The report module 600 then configured to determine whether one or more reports are required based upon receipt of the adjusted rate data, as may be pre-determined according to particular applications. Detailed steps performed by various embodiments of the data module 400 are described in relation to FIG. 6; steps performed by various embodiments of the analysis module 500 are described in relation to FIG. 7; and steps performed by various embodiments of the report module 600 are described in relation to FIG. 8.

Figure 4:
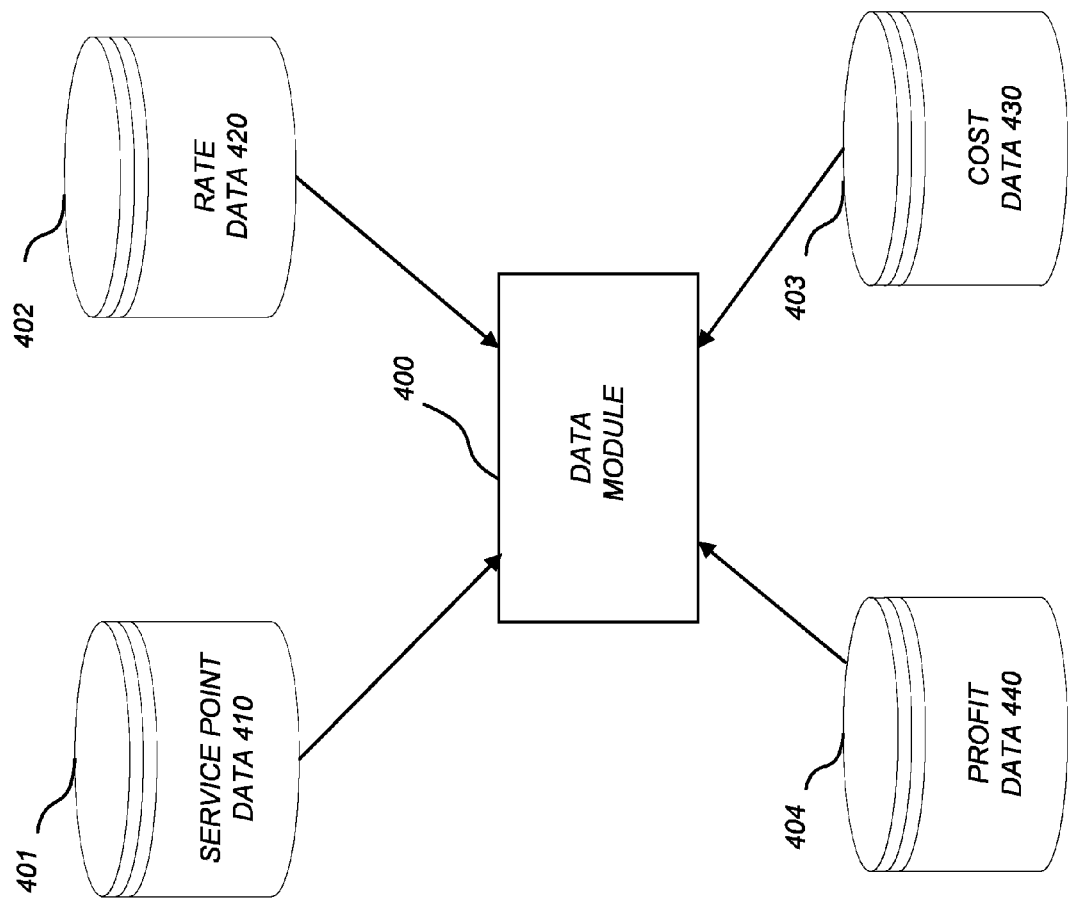
FIG. 4 illustrates a schematic diagram of various databases that are utilized by the rate structuring system 20 shown in FIG. 1 according to various embodiments.

As will be described in more detail below in relation to FIGS. 4 and 5, the data module 400, according to various embodiments, receives and maintains various pieces and/or categories of data via one or more databases in communication with the module. FIG. 4 illustrates a block diagram of various exemplary databases from which the data module 400 receives, retrieves, and/or stores this information. In particular, in at least the embodiment shown in FIG. 4, the following databases are provided: a service point database 401, a rate database 402, a cost database 403, and a profit database 404. Although the embodiment of FIG. 4 shows these databases 401, 402, 403, 404 as being separate databases each associated with different types of data, in various other embodiments, some or all of the data may be stored in the same database. In still other embodiments, additional and/or alternative databases may be provided, as may also be desirable for particular applications.

According to various embodiments, the service point database 401 may be configured to receive, store, manage, and transmit any of a variety data associated with one or more of a plurality of service points identified within a large scale transportation network. Generally speaking, according to various embodiments, a service point may be defined as the lowest level of granularity to which a service provider differentiates package deliveries. In other words, if delivery driver/personnel discriminate between two adjacent addresses on a single street, each residence at each address would be a distinct service point. In certain embodiments, it should be understood however, that various degrees of granularity may be desirable, including at the non-limiting degrees of discrimination of a street-by-street basis, a neighborhood-by-neighborhood basis, an apartment complex basis, a school zone basis, or otherwise. However, for purposes of succinctness, where elsewhere herein a service point is described generically, such should be considered to comprise a discrete address to which a package may be delivered.

Turning to FIG. 9 to further describe how service points and thus service point data 410 is defined according to various embodiments, an illustration is first provided of a plurality of exemplary geographical areas 701. In particular, each of the exemplary geographical areas 701 correspond approximately to a zip-code area, as are commonly known and understood in the art. As has been previously mentioned, conventional rate structure systems utilize area 701 having a granularity approximate to such areas 701, thus presenting certain inefficiencies and/or deficiencies. Noting in particular the area 710 of FIG. 9, representing the zip code area for 30064, such may be also seen with regard to FIG. 10. As illustrated in that figure, the approximate area 710 corresponds generally with the actual boundary 710A of zip code 30064.

Remaining with FIG. 10, it should be understood that one or more geographic sub-areas may be defined according to various embodiments of the rate structuring system 20. In certain embodiments, wherein the granularity of service points is finer than the "zip-code" specificity found in conventional models, the system 20 may be configured to identify a plurality of sub-areas (e.g., 720, 750, 780, 785, 790, and the like). The identification thereof may be based, in at least one embodiment, upon differing degrees of operating revenue (see also FIGS. 13A-13C), as may be desirable for certain applications. Of course, the identification of one or more sub-areas (e.g., 720, 750, 780, 785, 790, and the like) may be based upon any of a variety of differing parameters, as may be desired by one or more users of the system 20. That being said, in at least those embodiments as will be described elsewhere herein, the determination thereof will be based upon differing degrees of profit, as may be calculated, for example, by subtracting cost data 430 for the particular sub-areas from rate data 420, as will be described in further detail below.

Turning now to FIGS. 11 and 12, however, it should be understood that according to various embodiments, and indeed per those that will be substantially referred to elsewhere herein, the sub-areas (e.g., 720, 750, 780, 785, 790, and the like), where such even may be identified by the system 20 may further comprise a plurality of discrete service points, defined substantially on the basis of individual address points, whereat one or more package deliveries have been made (e.g., over a historical period of time) and/or may be made. As illustrated in FIG. 11, a plurality of discrete service points 721-749 may be defined by the system 20, such that each corresponds substantially to a single residence. Of course, in certain embodiments, even certain of the points, for example 746-749 may each comprise a handful of discrete address points. Such may be desirable, for example, where delivery personnel transport packages to a front office of an apartment complex or a business complex, as may be the case. In such embodiments, the lowest level of granularity may be that to which the service provider differentiates distinct delivery points. Of course, in still other embodiments, as may be understood from points 721-745, the lowest level of granularity may be to individual addresses for which package deliveries exist.

Remaining further with FIGS. 11 and 12, it should be likewise understood that in certain embodiments of the system 20, it may be that differing levels of granularity exist within single geographical areas 701. While, in at least one embodiment, every service point equates to an individual discrete address point on a map, in other embodiments, the service points may comprise a mixture and/or combination of address points, consolidated delivery points, and the like, provided, however, that such nevertheless provide an improved degree of granularity over the conventional "zip-code" based models and systems.

Returning now to FIGS. 4 and 5, it should be understood that according to various embodiments, the service point database 401 essentially manages (e.g., receives, stores, and transmits) any of a variety of data associated with one or discrete service points, as may be defined as previously described herein. In certain embodiments, the received, stored, and managed data may comprises characteristics associated with the non-limiting examples of density characteristics, access characteristics, equipment usage characteristics, personnel usage characteristics, fuel usage characteristics, package delivery volume characteristics, package delivery frequency characteristics, and the like. It should be understood that access characteristics may include such data as the proximity of a delivery residence to a street, the presence of a gated entrance thereto.

Still further, according to various embodiments, the service point database 401 further maintains recorded delivery characteristics, such as the trip time from pickup to delivery, "first mile" data, "last mile" data, and duration of delivery time incurred, upon arrival at the service point. Additional time-based characteristics may also be received, maintained, and stored within the service point database 401. In certain embodiments, receipt of data may be via any of the distributed devices 100, 110 described previously herein, although it should be understood that in at least one embodiment a majority of the service point data 410 is acquired via one or more handheld devices associated with and accompanying delivery personnel as package deliveries are made on a day-to-day basis.

As a non-limiting example, as the delivery personnel travels to various locations, vehicle and time data is recorded, further as the personnel has arrived at the service point and remains idle awaiting final delivery. Such data then becomes the discreet "service point data" associated with that particular service point, as such will be referenced elsewhere herein. In this manner, extensive and accurate data may be compiled and associated directly with each discrete address for which a package delivery is scheduled and/or completed.

In any event, in these and still other embodiments, it should be understood that, upon receipt, the service point database 401 will store any newly received service point data 410 in a manner associated with at least the data module 400 and for provision (whether automatically, manually, or at a later time) to one or more of the modules 500-600, as will also be described in further detail below. Although receipt of new data has been described, it should be understood that, over time, the database 401 will comprise a mixture of real-time and historical trend data that may utilized by the rate adjustment server 200 in a manner as will be described in further detail below. Of course, in any of these and still other embodiments, a variety of alternative configurations of the database 401 could exist, as data storage mechanisms may be commonly known and understood in the art.

Returning now with particular focus upon FIG. 4, the rate database 402 may be configured according to various embodiments to receive, store, manage, and transmit any of a variety data associated with one or more rates assigned to one or more geographical areas within and/or covered by a large scale transportation network. In certain embodiments, the rate data 420 may be historical in nature and associated with one or more geographical areas of greater granularity than the service point level, as previously described herein. As a non-limiting example, in at least one embodiment, the rate data 420 may comprise zip-code based rates, as may have been previously assigned according to one or more conventional systems, as commonly known and understood in the art. In these and still other embodiments, it should also be understood, however, that the rate database 402 may comprise rate data 420, as such is calculated by the rate adjustment module 500 described elsewhere herein; such is particular true wherein the rate adjustment module 500 is iteratively executed over time, as costs associated with a particular service point may fluctuate. As such, it should be further understood that the bases of the rate data 420 contained within the rate database 402 may likewise vary, wherein, for example, one rate may apply across a zip-code and thus include service point A, while another rate may only apply to service point A. In any event, in these and still other embodiments, upon receipt of rate data 420, whether from the rate adjustment module 500 or otherwise, the database 402 will store such received data in a manner associated with at least the data module 400 and for provision (whether automatically, manually, or at a later time) to one or more of the modules 500-600, as will also be described in further detail below. Of course, in any of these and still other embodiments, a variety of alternative configurations could exist, as commonly known and understood in the art.

According to various embodiments, the cost database 403 may be configured to receive, store, manage, and transmit any of a variety data associated with costs incurred by a common carrier service provider during the ordinary course of delivering one or more packages to a plurality of service points within a large scale transportation network. In certain embodiments, the cost database 403 may receive such data, as calculated based at least in part upon the service point data 410 from an external system, in which case the cost data 430 may not necessarily be further calculated by the rate adjustment module 500, as will be described elsewhere herein. In other embodiments, at least some portion of the cost data 430 may be calculated by at least one tool of the rate adjustment module 500, upon calculation of which such data may be saved within the cost database 403. As iterative executions of the module 500 and accompanying tool occur, cost data would be thus accumulated.

Although various formulas exist for determining and calculating cost, it should be understood that according to various embodiments described herein, cost data 430 should generally be understood to comprise a cost value per unit time for a particular component (e.g., personnel, equipment, facilities, fuel, and the like), which may or may not be multiplied by a time value associated with a particular service point (e.g., 2 hours in transit time+15 minutes in delivery point wait time). As a non-limiting example, thus, cost data 430 could comprise a cost of $500 for delivery to service point A, based upon fixed costs of $250/hour for a 2 hour period. While in certain embodiments, not all cost value data may be time based, in others such may be the case. Still further, while in certain embodiments, the cost data 430 may be calculated on a service point basis, in other embodiments it may be at least initially otherwise calculated, thus requiring further processing by the rate adjustment module 500 to, for example, convert the same to cost per service point and/or cost per package per service point, all as will be described in further detail below.

In any event, in these and still other embodiments, it should be understood that, upon receipt, the database 403 will store any newly received cost data 430 in a manner associated with at least the data module 400 and for provision (whether automatically, manually, or at a later time) to one or more of the modules 500-600, as will also be described in further detail below. Of course, in any of these and still other embodiments, a variety of alternative configurations could exist, as commonly known and understood in the art.

According to various embodiments, the profit database 404 may be configured to receive, store, manage, and transmit any of a variety data associated with profits realized by a common carrier service provider during the ordinary course of delivering one or more packages to a plurality of service points within a large scale transportation network. In certain embodiments, the profit database 404 may receive such profit data 440, as may be calculated based at least in part upon the cost data 430 and the rate data 420 (e.g., profit=rate−cost) from an external system, in which case the profit data 440 may not necessarily be further calculated by the rate adjustment module 500, as will be described elsewhere herein. In other embodiments, at least some portion of the profit data 440 may be calculated by at least one tool of the rate adjustment module 500, upon calculation of which such data may be saved within the profit database 404. As iterative executions of the module 500 and accompanying tool occur, historical trend data associated with profit data would be thus accumulated. In any event, in these and still other embodiments, it should be understood that, upon receipt, the profit database 404 will store any newly received profit data 440 in a manner associated with at least the data module 400 and for provision (whether automatically, manually, or at a later time) to one or more of the modules 500-600, as will also be described in further detail below. Of course, in any of these and still other embodiments, a variety of alternative configurations could exist, as commonly known and understood in the art.

According to various embodiments, any of the previously described databases may be configured to store and maintain not only textually based data, but also graphically based data, as may be generated by the rate structuring system 20 (or otherwise) and be based, at least in part, upon the textually based data. Still further graphical (e.g., charts, graphs, maps, etc.) may also be stored within one or more of the databases, wherein such may be, at least in part, independently derived, relative to the textually based data. Non-limiting examples of such graphically based data include trend graphs, historical plot charts, pie charts, diagrams, and the like, all as will be described in further detail elsewhere. In any event, it should be understood that in any of these and still other embodiments, the graphically based data may be used to visually combine various portions of data contained within the various databases previously described herein. Still further, various algorithms and/or pre-determined parameters, rules, and/or mitigating procedures may also be stored within the system 20, as may be desirable for various applications.

Summary of Exemplary System Operation

As indicated above, various embodiments of the rate adjustment server 200 execute various modules (e.g., modules 400, 500, 600) to provide a network that is resilient to unexpected changes in circumstances while also maintaining a high level of customer satisfaction and flexibility.

According to the embodiment shown in FIG. 5, the rate structuring server 200 begins with the execution of the data module 400, which is configured to receive, store, manage, and transmit service point data 410, rate data 420, cost data 430, and profit data 440. In an exemplary embodiment, at least the service point data 410 is initially transmitted to the rate adjustment module 500. In certain embodiments, any combination of rate data 420, cost data 430, and profit data 440 may be transmitted to the rate adjustment module 500 subsequent to or separately from the service point data 410 transmittal. Of course, in still other embodiments, any combination of a variety of data 410-440 may be transmitted, as may be desirable for particular applications. It should be understood however, that in at least some embodiments, wherein the rate adjustment module 500 may be configured to calculate cost data 430 and/or profit data 440 on at least a service point basis, such data may be transmitted first from the module 500 to the data module 400. In still other embodiments, historical cost and/or profit data 430, 440 may be transmitted as well, in a sort of two-way exchange of data, as may be desirable when, for example, a comparison is conducted on cost/profit trends, as will be described in further detail below.

In any event, once at least service point data 410 has been received according to various embodiments by the rate adjustment module 500, the module is configured to execute a rate adjustment tool 510. Generally speaking, the rate adjustment tool 510 determines an optimal adjustment for one or more shipping rates to be applied at corresponding ones of shipping points, as previously defined herein. In certain embodiments, the rate adjustment tool 510 determines the rate from an analysis performed upon at least the service point data 410 and some portion of existing rate data 420. In other embodiments, the tool 510 utilizes at least a portion of existing cost and/or profit data 430, 440 to further inform its analysis, while in still other embodiments, the tool 510 is configured to independently calculate cost and/or profit data, all as will be described in further detail below.

According to various embodiments, once the rate adjustment module 500 has generated rate adjustment data 515 via the execution of the rate adjustment tool 510, the report module 600 is configured to determine whether report data 615 should be generated based at least in part thereon, as may be pre-established according to any of a variety of parameters associated with the system. For example, users of the system may set parameters, such as a threshold rate change, upon occurrence of which they may wish to receive one or more notifications thereof. As another non-limiting example, various shipping request systems and components, as commonly associated with the rate structuring system 20 may also require notification, so as to update their databases in a manner such that customers thereof are presented with and incur the most recently applied rate schedule. Still further non-limiting examples of charts and reports, which may be useful for internal common carrier provider metrics and be generated, as illustrated in at least FIGS. 14A-H.

Data Module 400

According to various embodiments, as previously mentioned herein, the data module 400 is configured to receive, store, manage, and transmit service point data 410, rate data 420, cost data 430, and profit data 440 (see FIG. 5).

FIG. 6 illustrates steps that may be executed by the data module 400 according to various embodiments. Beginning with step 445, the data module 400 assesses whether any data, in particular any service point data 410 has been received by the module. In certain embodiments, the data module 400 makes this assessment by periodically scanning one or more databases (see FIG. 4) associated with the module and by identifying some portion of data within one or more of the databases that was not present during a previous periodic scan under step 445. Of course, alternative configurations may be envisioned, wherein, as a non-limiting example, the data module 400 may actively receive data (e.g., as input by a user of the system 20 (e.g., delivery personnel) via an interface (e.g., a DIAD device)) and upon receipt thereof, execute step 460. Indeed, in any of these and still other various embodiments, if "newly received" data is identified, the data module 400 proceeds to step 460; otherwise the module proceeds into a static loop via step 450.

During step 450, the data module 400 may be configured to passively stand by for receipt of new data, whether in the form of service point data 410, rate data 420, cost data 430, profit data 440, any combination thereof, and the like. In certain embodiments, the module 400 may, in step 450, periodically (e.g., every 5 seconds, or at any desirable interval) proactively ping one or more databases contained therein. Various alternative data monitoring configurations may be envisioned, without departing the scope and nature of the present invention.

As mentioned, upon receipt of service point data 410, the data module 400 proceeds to step 460, during which the data module transmits the received data to at least the rate adjustment module 500 for further handling and processing. In certain embodiments, only the service point data 410 may be transmitted at this time to the module 500, with at least current cost and profit data 430, 440 being later derived therefrom by the module, as will be described in further detail later. In other embodiments, however, historical and/or current cost data 430 and/or profit data 440 may be pre-calculated (e.g., by another system) and thus provided to the rate adjustment module 500 during step 460 as well. In still other embodiments, only historical cost and profit data 430, 440 may be pre-calculated and provided, while current data is determined by the rate adjustment module 500. Of course, in any of these and still other embodiments, it should be understood that rate data 420 may be further provided in step 460, although in at least certain embodiments such may be later transmitted by the data module 400, whether proactively or in a passive manner, for example, in response to a request therefor from the rate adjustment module 500.

Still further, according to various embodiments, the data module 400 may be configured to only passively and/or periodically perform step 460, even with respect to transmittal of the service point data 410. In certain embodiments, however, the data module 400 may automatically perform step 460. Where performance is either passive or automatic, such may nevertheless be configured according to certain embodiments to occur at an interval predetermined by one or more users of the system 20, as may be desirable for particular applications. As previously mentioned, in still other embodiments, the data module 400 may automatically transmit one portion of the data (e.g., service point data 410), while another portion of the data (e.g., rate data 420) may be transmitted subsequently, and when so, only upon request therefor by the rate adjustment module 500, as will be described in further detail below.

Rate Adjustment Module 500

According to various embodiments, as previously mentioned herein, the rate adjustment module 500 is configured to activate and execute a rate adjustment tool 510 (see FIG. 5), which is itself configured to at least determine an adjusted rate (e.g., rate adjustment data 515) for each service point within a geographical area, based at least in part upon the service point data 410.

FIG. 7 illustrates steps that may be executed by the rate adjustment module 500 according to various embodiments. Beginning with step 520 by receiving at least some portion of data from the data module 400. It should be understood that in certain embodiments, the rate adjustment module 500 may be configured to periodically and/or continuously proactively retrieve and/or check for new data 410-440, as may be transmitted from the data module 400. In other embodiments, the rate adjustment module 500 may merely passively await receipt of data from the data module, as may be desirable for particular applications.

According to various embodiments, data received in step 520 may comprise one or more pieces of service point data 410, as may be collected dynamically by delivery personnel employed by the common carrier service provider using the system 20. In certain embodiments, such may be dynamically transmitted to one or more of the modules 400-600 of the system 20, either in a real-time fashion, at a predetermined frequency (e.g., daily, at end of day), or otherwise, as may be desirable for particular applications. It should be understood, however, that the data received in step 520 may consist only of service point data 410 in certain embodiments, while in other embodiments, rate, cost, and/or profit data may also be received substantially simultaneously.

It should also be further understood that, prior to entry into the data module 400 and further provision to the rate adjustment module 500, the various received pieces of data may be independently collected and/or calculated as described elsewhere herein. For example, at least the service point data 410 may be obtained via a user interface screen display, which may be populated upon a delivery personnel's device, such as a DIAD, also as described elsewhere herein. Such user interface screen displays, although not illustrated, should be understood to comprise any exemplary interface, as such are commonly known and understood in the art.

Returning now specifically to FIG. 7, upon execution of step 520, the rate adjustment module 500 according to various embodiments is configure to proceed to step 530, wherein a rate adjustment tool 510 is executed. As will be described in further detail below, the rate adjustment tool 510 may be configured to perform one or more calculations that will, at least in part, determine a degree to which particular rates for particular service points within a common carrier's transportation network will be adjusted. Such will be generated as adjustment data 515 (see, for example, steps 580 and 585).

Remaining with FIG. 7, upon execution of step 530, the rate adjustment module 500 according to various embodiments is configured to proceed to step 534, wherein a calculation is performed to determine cost data 430 for each service point (e.g., addresses 721-749 of FIG. 11 and/or addresses 751-779 of FIG. 12, as previously described herein). In certain embodiments, such calculation is performed via one or more algorithms and/or rules engines, as may be embodied within the rate adjustment tool 510. In at least one embodiment, the algorithm/engine multiples at least the equipment usage characteristics, personnel usage characteristics, fuel usage characteristics, package delivery volume characteristics, package delivery frequency characteristics, and the like (as previously described herein) against a time characteristic, as may be recorded by the delivery personnel, the delivery vehicle, the remote device (e.g., DIAD), or otherwise. In certain embodiments, the algorithm may be configured to apply any of a variety of weights and/or preferences to various ones of the aforementioned parameters while determining the cost data 430, as may be desirable for particular applications. In other embodiments, additional data, such as "first mile cost data," "last mile cost data," and the like may be further incorporated, weighted, and/or otherwise considered via execution of the rate adjustment tool 510 in specific step 534.

Of course, as should be understood from a combination of FIGS. 5 and 7, the calculation in step 534 may be further informed by existing (e.g., historical-based) cost data 430, as such may be contained within the data module 400 in at least certain embodiments. For example, the cost data 430 calculated in step 534 may be further weighted, varied, or otherwise analyzed based at least in part upon a comparison thereof to at least a portion of the pre-existing cost data for that particular service point. Of course, in at least one embodiment, where for example real-time or current cost data may not be readily available, reliable, or otherwise, the tool 510 may be configured to bypass at least step 534, and use instead as its calculation of cost data 430 at least a portion of the existing cost data within the data module. Such a "bypass" process of at least this embodiment is illustrated as step 540 of FIG. 7.

Remaining with FIG. 7, in certain embodiments, upon completion of step 534, the rate adjustment module 500 is configured to proceed to step 538, wherein a calculation is performed to determine cost data 430 for each package delivered to each service point (e.g., addresses 721-749 of FIG. 11 and/or addresses 751-779 of FIG. 12, as previously described herein). It should be understood that in at least certain embodiments, such a calculation, as performed by the rate adjustment tool 510 or otherwise, may be simply a mathematical derivation of the same from the cost data calculated in step 534, namely on a service point basis, and data indicative of a number of packages delivered thereto. As such, it should be understood that this step, as described for step 534 above, may be performed external to the rate adjustment module 500 in at least one embodiment; however, such will not typically be the case as historical and real-time comparisons necessarily inform at least a portion of the calculations performed in steps 534 and 538 as described herein, without which the subsequent profit and/or operating revenue determinations for each service point may be less accurate than otherwise achievable. That being said, in some embodiments, as will be described elsewhere herein, where the profit data for each service point is calculated based upon an existing rate for that service point and a calculated cost for that service point, further determination of a cost per package at that service point may prove unnecessary in certain applications.

With that in mind, returning to FIG. 7, upon completion of either step 530, 534, or 538, the rate adjustment module 500 is configured according to various embodiments to proceed to step 550, wherein rate data 420 is retrieved from the data module 400. Of course, in certain embodiments, the rate data 420 may have been received alongside the service point data 410 in step 520; however, in other embodiments, such occurs later, as may be desirable in some applications where, for example, the latest obtainable rate data is preferable for purposes of ensuring that the most accurate "real-time" calculations are performed by the rate adjustment tool 510.

Upon retrieval and/or receipt of the rate data 420 in step 550 or otherwise, the rate adjustment module 500 is configured according to various embodiments to proceed to step 560. During step 560, the rate adjustment module 500 is configured to calculate profit data 440 for the at least one service point under evaluation. In certain embodiments, the calculation of profit data 440 is executed by at least one of the algorithms and/or rules engines found within the rate adjustment tool 510, as previously described herein. In at least one embodiment, a single algorithm/engine tool is configured to sequentially execute at least steps 534, 538, 550, and 560, all as described elsewhere herein; in other embodiments, however, separate algorithms/engines may be desirable, for example where at least certain steps (e.g., 534 and/or 538) may only be executed under certain circumstances.

Returning to step 560, it should be understood that according to various embodiments, the calculation of profit data 440 may involve a mathematical manipulation of at least the rate data 420 retrieved in step 550 and the cost data 430 calculated in either one of steps 534 or 538, depending on however as may be desirable for particular applications. In at least one embodiment, the profit data 440 is calculated by subtracting the calculated cost data 430 in step 534 from the retrieved rate data 420, thereby resulting in profit data 440 for each service point on a per package basis. In other embodiments, the profit data 440 may be instead calculated by subtracting the calculated cost data 430 in step 538 from the retrieved rate data 420, thereby resulting in profit data 440 for each service point on a service point level of granularity. Of course, various alternative calculations, algorithms, and the like (perhaps even involving weighting, prioritizing, and/or trending of data points) may be envisioned, without departing from the scope and nature of the present invention.

In at least one particular embodiment, for example, during step 560, the rate adjustment module 500 may be configured to take into account historical trend cost data 430 when determining the profit data 440 for each service point, as it may be desirable for certain applications to ascertain trend lines indicative of profits over time. By taking such parameters into account, the rate adjustment module 500 may be configured, as will be described in further detail with respect to step 570 to apply a lesser adjustment (or perhaps even apply no adjustment) where such historical data is indicative of the present "real-time" data being an outlier when viewed over time. Of course, still other weightings of parameters, whether historical or trend-setting in nature, may also be envisioned, without departing from the scope and nature of the present invention.

In any event, upon calculation of profit data 440 for each service point in step 560, the rate adjustment module 500 is configured according to various embodiments to proceed to step 570. During step 570, the rate adjustment module is configured to determine whether the profit data 440 for a particular service point is relatively higher or lower than a pre-defined standard value for expected (or desired) profit values. In certain embodiments, the pre-defined standard may be established by the common carrier service provider based upon one or more algorithms and/or business models created external to the system 20 described herein. However, such data may be provided to the system, for example, as a portion of the profit data 440 that pre-exists within the data module 400 (see, for example FIG. 5), perhaps alongside historical trend data associated with anticipated and/or observed profit values. In still other embodiments, it should also be understood that the profit data 440 may be compared against a portion of the existing historical trend data, rather than a pre-defined standard value derived therefrom.

In still other embodiments, the rate adjustment module 500 may be configured to analyze two or more service points simultaneously, in which case, the relative comparison in step 570 may be between the two or more service points (e.g., finding points with relatively higher versus relatively lower profits points). In such instances, the midpoint may be defined by any of a variety of mathematical functions, including the non-limiting examples of the median profit, the average profit, and/or the mean profit across the analyzed service points. In these and still other embodiments, it should be understood that the rate adjustment module 500 may be further configured to determine additional parameters (e.g., a rate adjustment, a degree thereof, a deferred implementation thereof, and the like), as will be described in further detail below.

If, during step 570, it is determined by the rate adjustment module 500 (e.g., the rate adjustment tool 510) that the profit data 440 for a particular service point is at least some degree higher relative to a pre-determined standard (or another service point, or otherwise), the module is configured according to various embodiments to proceed to step 580. During step 580, for those service points having a relatively lower profit margin and/or operating revenue, the rate adjustment module 500 (or the tool 510 thereof) is configured to increase the rate for that particular service point. In certain embodiments, the rate is immediately increased, while in other embodiments, the increase may be implemented gradually over time and/or deferred until a particular future point in time, as may be desirable for particular applications. At least the increased rate is stored within rate adjustment data 515, as is further generated in step 580.

According to various embodiments, the increased rate in step 580, which may be stored further as at least apportion of rate adjustment data 515, may be further informed by various parameters within at least one of the rate data 420, the cost data 430, and the profit data 440, as stored within the data module 400. In certain embodiments, the increase in rate may not be substantially the same as the degree to which the calculated profit data differs from the compared against standard, for example, where a sudden differentiation in rate could prove counterproductive to profit values (and/or other tracked parameters) that are of business importance. In such instances, as a non-limiting example, the rate adjustment may be a minor degree of the observed difference at first, with gradual further increases being scheduled by the rate adjustment module 500 and captured within at least the rate adjustment data 515 for future reference and use. In still other embodiments, the degree of rate adjustment may be further informed by any of a variety of factors, such as historical trend lines, historical mean data, historical average data, future trend goals, and the like, without departing from the scope and nature of the present invention.

With reference momentarily to FIGS. 13A-C, it should be understood that the rate adjustment module 500 may compare calculated operating revenue values for two discreet service points against an average operating revenue value for the broader geographical unit. Specifically, with reference to FIGS. 13A-B, the first value of 0.91 and the second value of 1.05 lie on either side of the average value of 0.95. As such, upon reaching step 570, the rate adjustment module 500 may be configured to assess the values of 0.91 and 1.05 to determine whether each is relatively higher or lower than the standard 0.95 value. For the 1.05 value (indicative as a ratio of lower profits & higher costs), the module 500 proceeds to step 580, wherein the rate is increased (see FIG. 13C), as a result of which the operating revenue value will be slightly altered to 0.95, the effects of which as have been described elsewhere herein with respect to at least FIGS. 14A-H. In contrast, for the 0.91 value (indicative as a ratio of higher profits/lower cost), the module 500 proceeds to step 585, wherein the rate is decreased (see FIG. 13C), as a result of which the operating revenue value will be slightly altered to 0.92, as will be described in further detail below with reference to step 585.

Returning now to FIG. 8, if in step 580, upon applying (or indicating an intention within the rate adjustment data 515 to apply) an increase to the existing rate (e.g., from rate data 430 for particular service point) and/or generating rate adjustment data 515 indicative thereof and/or associated therewith, the rate adjustment module 500 is configured to proceed to step 590. During step 590, the rate adjustment module 500 is configured to transmit at least the rate adjustment data 515 to the report module 600 for further processing and evaluation, as will be described in further detail below.

Returning now to step 570, if therein it is instead determined by the rate adjustment module 500 (e.g., the rate adjustment tool 510) that the profit data 440 for a particular service point is at least some degree higher relative to a pre-determined standard (as has been described previously herein), the module is configured according to various embodiments to proceed to step 585. During step 585, for those service points having a relatively higher profit margin and/or operating revenue, the rate adjustment module 500 (or the tool 510 thereof) is configured to lower the rate for that particular service point. In certain embodiments, the rate is immediately lowered, while in other embodiments, the decrease may be implemented gradually over time and/or deferred until a particular future point in time, as may be desirable for particular applications. At least the decrease in rate is stored within rate adjustment data 515, as is further generated in step 580.

Upon, in step 585, applying (or indicating a need to apply) a decrease to the existing rate (e.g., from rate data 430 for particular service point) and generating rate adjustment data 515 indicative thereof and/or associated therewith, the rate adjustment module 500 is configured to proceed to step 590, as has been previously described herein.

Of course, it should be understood that according to various embodiments, steps 580 and 585 may not be implemented in the particular sequence described previously herein. Indeed, where multiple service points are being evaluated by the rate adjustment tool 510, the module 500 may be configured to first increase the rate in step 580 for those service points having lower profits and higher cost data associated therewith, deferring until a later data a decrease in the rate in step 585 for those additional service points, which have higher profits and lower cost data. In this manner, operators of the system 20 described herein (e.g., common carrier service providers) may witness, record, and analyze any of a variety of parameters associated with package shipment costs, rates, and profits, so as to accurately and efficiently ascertain the impact created by the rate adjustment data 515. Indeed, in at least one scenario, adjustment of multiple factors may prevent identification of the source of a positive and/or negative impact upon, for example, the volume of packages transported during a particular period of time. Of course, any of a variety of combinations, sequences, and the like of adjusting various rates within a large-scale transportation network may be envisioned, without departing from the scope and nature of the basis for such adjustments, as described herein with regard to various embodiments of the present invention.

Report Module 600

According to various embodiments, as previously mentioned herein, the report module 600 is configured to determine whether one or more reports are necessary based at least in part upon received rate adjustment data 515 and to generate and/or transmit the same, as appropriate.

FIG. 8 illustrates steps that may be executed by the report module 600 according to various embodiments. Beginning with step 620, the report module 600 may be configured to query whether any adjustment data 515 has been received from the rate adjustment module 500. If no data has been received, the report module 600 is configured according to various embodiments to proceed to step 625, wherein the module stands by to receive one or more pieces of data. In certain embodiments, the report module 600 may simply passively await receipt of data during step 625, while in other embodiments, the report module 600 may at least periodically (e.g., as pre-determined by one or more users of the system 20) actively query one or more of the modules 400-500 for data, as may be desirable for particular applications. Of course, any of a variety of data calling and/or transmission configurations may be envisioned, without departing from the scope and nature of the present invention.

Remaining with FIG. 8, upon receipt of data in step 620, various embodiments of the report module 600 are configured to proceed to step 630, during which a determination is made as to whether one or more reports are required, based at least in part upon the nature of the received data and/or one or more pre-established user parameters therefor. If one or more reports are desired, the report module 600 is configured according to various embodiments to proceed to step 640, as will be described further below; otherwise the module proceeds to step 660. During step 660, the data module 600 is configured according to various embodiments to transmit one or more items of data to the data module 400. In certain embodiments, such may comprise the rate adjustment data 515, which may itself contain updates pertinent to rate data 420, cost data 430, and/or profit data 440, as previously described herein. In other embodiments, such may further contain at least some portion of report data 615, even if under this flow-path involving nothing more than data indicative of the determination that no reports are necessary. In still other embodiments, it should be understood that no data may be transmitted during step 660 to the data module, as according to certain embodiments, where no reports are necessary, at least the rate adjustment data 515 may have been previously transmitted by the rate adjustment module 500, as previously described herein.

Returning to step 630 of FIG. 8, if during execution of the same, the report module 600 determines that one or more reports are desired, necessary, or otherwise appropriate for generation, the module is configured to proceed to step 640, wherein the module executes a report tool 610, which is itself configured to generate report data 615 during step 650. It should be understood, however, that the report data 615 may comprise any one or any combination of notifications, alerts, e-mails, phone calls, text messages, formal reports, charts, and the like, all as are commonly known and understood in the art. Still further, the various report data 615 may be textual, graphical, and/or any combination thereof, as may be desirable for particular applications.

With reference momentarily to FIGS. 14A-H, exemplary report data 615 is illustrated, primarily in the form of one or more charts that may be generated, for example, upon request therefor by a user of the system 20. Although the charts of FIGS. 14A-H are exemplary in nature, their content is further worth describing, with relation to the manipulations performed by the rate adjustment module 500, as previously described herein. In particular, FIGS. 14A-B illustrate the changing dynamic rate, as compared to both the average rate (e.g., in certain embodiments the historical and/or "zip-code" based rate) and the varying pickup & delivery cost. As may be understood from these figures, instead of applying a static rate across all package deliverables, regardless of pickup and delivery cost, various embodiments of the present invention raise the rate for those deliveries involving a higher than average cost, while simultaneously (or in at least one embodiment sequentially) lowering the rate for those deliveries involving a lower than average cost. As further selective rate adjustments are implemented, the dynamic rate line shifts, as particularly evident in FIG. 14B.

Perhaps more insightful, however, is the shifting volume curves of FIGS. 14C and 14D, which appear upon implementation of the dynamic rate adjustment, as previously described herein. FIG. 14C, in particular, illustrates the manner in which a carrier provider associated with the system 20 described herein may shift a volume curve associated with their transportation network, such that the highest volume occurs at a lower pickup & delivery cost point, than otherwise achievable without the dynamic rate adjustments. In other words, raising the rate for higher cost shipments and/or lowering the rate for lower cost shipments, in bulk, results in a lower average pick-up and delivery cost for the carrier provider, at least on a per volume basis.

FIG. 14D further illustrates an externality of the adjustments made possible via various embodiments of the system 20 described herein, namely a volume boost, as a result of at least in part the lower of the discrete point rate for those service points having a relatively lower pickup and delivery cost. Practically speaking, because of the rate adjustment, additional customers and thus additional volume of packages may flow to the carrier provider who uses the system. In this manner, not only is the cost point for the greatest volume reduced, but the volume achievable thereat is increased, providing a dual effect upon the accuracy and efficiency of the transportation network serviced by the system 20.

FIGS. 14E and 14F further illustrate the dynamically shifting cost/volume curves of FIGS. 14C and 14D, by applying the same in further exemplary report data 615 indicative of shifting profit curves. As may be seen in FIG. 14E, the lighter bars or profit are those achievable upon implementation of the dynamic rate adjustment too, whereby those higher cost packages achieve a greater return than otherwise achievable via a less precise (e.g., zip-code based) rate structuring system. Of course, the profitability of the lower to mid-cost packages may suffer somewhat, as illustrated in FIG. 14E, but overall profits (see FIGS. 14G & H) receive a boost.

FIG. 14F illustrates, much like FIG. 14D, the impact of an additional volume boost, achievable at least in part due to an increase of customer base and thus volume based upon the precision granularity of rate application (e.g., lower rates for lower cost packages/service points; higher rates for higher cost packages/service points). Because, over time, the volume boost occurs at those lower to mid-level cost points, it should be understood that although the intermediate profit levels of FIG. 14E may in certain embodiments initially suffer due to implementation of the rate structuring system 20 described herein, such minimal decrease is generally in these and still other embodiments offset by long term volume shifts and increases, as will typically flow organically from mere implementation of rate adjustments of the type as previously described herein.

With combined reference again to FIGS. 14A-H, it should be understand that such charts and reports (e.g., report data 615) may be generated and/or transmitted by the report module 600 upon request or otherwise, as may be desirable according to various applications. That being said, other portions of the report data 615 may be provided, not to those who may analyze the internal impacts and/or benefits of implementing the system 20 described herein, but to users and/or customers of the system. In certain embodiments, one or more of the alerts and/or notifications generated by the report module 600 may be transmitted to a customer, informing them of at least a newly applied rate for their particular service point, however as such notification may be required according to various terms of a contract entered into between such a customer and a carrier provider or otherwise, all as is commonly known and understood in the art.

Miscellaneous Considerations

Turning now to FIG. 15, it should be understood that according to various embodiments, the rate structuring system 20 described elsewhere herein may be configured to operate alongside additional components and/or infrastructure, for example, as may be maintained and/or provided by a common carrier service provider using the system 20. As may be seen from this figure, a network interface (e.g., of any of the types previously described herein) may be provided between the base system (e.g., the illustrated "high precision cost (HPC) analyzer predictor" and "the HPC predictor dataset") and one or more of an Address Management System 10 (as commonly known and understood in the art), an online pricing engine 25 configured to generate real-time customer quotes 26, and a price bid modeler 27 configured to generate aggregate prices 28 for a set of customer queries. Specifically, the "online" pricing engine (or quote tool) 25 may be configured to further process the rate adjustment data 515, as previously described herein, so as to provide customers (whether existing or potential) real-time rate quotes, which may in certain embodiments be based upon customer queries regarding the same. In at least some embodiments, the real-time quotes may be provided online, for example via one or more customer interfaces and/or portals that may be accessible via a website that is networked with the system 20.

Still further referencing FIG. 15, it should be further understood that the online pricing engine 25 may be configured according to various embodiments to incorporate not only one or more rules (e.g., profit margins, strategies) and the like, as previously described herein for the purpose of adjusting the rate for a particular service point appropriately (e.g., as may be desirable for particular scenarios), but also to identify and/or apply account-based discounts, particular for existing customers. Of course, in other embodiments, one or more discounts may be either applied or offered to potential customers, perhaps as an incentive to enter into a contract for use of the system 20, as described previously herein, and access to the competitive rate and rate adjustment process provided thereby. The one or more real-time customer quotes 26 generated may additionally and/or alternatively be transmitted via the report module 600, as previously described herein.

Remaining still with FIG. 15, a pricing bid modeler 27 is also illustrated, with performs an offline process, at least some analogous to that executed by the online pricing engine 25, at least in that it takes into consideration account-based discounts and one or more rules or carrier preferences concerning profit margins and strategies therefor. Instead of providing real-time customer quotes however, the pricing bid modeler 27 generates an aggregate price 28 for a collection of queries, as may be submitted for large-volume customers, who may be debating whether or not to enter into a contractual agreement for use of the system 20, as described previously herein, and access to the competitive rate and rate adjustment process provided thereby. In at least one embodiment, the aggregate rate generated represents a rate that may be offered to the customer (or potential customer) based at least in part upon the volume requested thereby, wherein in certain instances the aggregate rate may differ at least to some degree from the basic rate adjustment data 515 generated and described elsewhere herein. In this manner, the aggregate pricing process provides an additional degree of data manipulation, so as to acquire the optimal rate not only for each entity delivering to particular service points, at least in part based upon characteristics associated with those entities.

With reference still to FIG. 15, it should of course be understood that the pricing bid modeler 27, in addition to providing aggregate rate data in at least scenarios involving large volume users of the system 20, may be also configured for use by internal personnel of the common carrier service provider. In certain embodiments, the pricing bid modeler may be configured such that profit margins and the like can be predictively modeled for one or more existing customers or package lanes serviced by the system 20. In this manner, overall profit margins and associated rates and rate adjustments therefor may be predictively modeled. Such, amongst other benefits, provides a mechanism for providing data which the common carrier service provider may present to potential customers and/or vendors and the like, as incentives for using the system 20, as described elsewhere herein.

CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A rate structuring system for determining a rate adjustment for at least one service point within a geographical area, said system comprising:
   one or more memory storage areas containing at least rate data and one or more parameters, said rate data comprising existing rates for delivery of packages to each discrete one of said at least one service points within said geographical area, said geographical area corresponding to an area having a single zip-code; and
   one or more computer processors configured to:

(A) receive service point data, said service point data comprising one or more real-time observed characteristics associated with delivery of at least one package to one or more of said at least one service points within said geographical area;
(B) retrieve at least a portion of said rate data contained in the one or more memory storage areas;
(C) calculate at least one of cost data or profit data for each service point associated with said received service point data;
(D) compare said calculated at least one of cost data or profit data against said one or more parameters contained in the one or more memory storage areas;
(E) in response to at least a portion of said calculated data differing from at least one of said one or more parameters, automatically based thereon generate rate adjustment instructions, said instructions being configured for facilitating automatic implementation of an adjustment to said rate data for each service point associated with said received service point data; and
(F) upon generation of said rate adjustment instructions, automatically transmit said rate adjustment instructions to at least one or more shipping request systems associated with and distinct from said rate structuring system for automatic implementation of said adjustment to said rate data so as to ensure said one or more users are presented with and incur updated rate data based upon a rate schedule incorporating said adjustment for each service point associated with said received service point data.

2. The rate structuring system of claim 1, wherein cost data is calculated in (C) and wherein:
  if said cost data is greater than said one or more parameters, said adjustment is an increase of said rate data; and
  if said cost data is less than said one or more parameters, said adjustment is a decrease of said rate data.

3. The rate structuring system of claim 2, wherein said one or more parameters are selected from a group consisting of an average cost for all service points across said geographical area, a median cost for all service points across said geographical area, and a mean cost for all service points across said geographical area.

4. The rate structuring system of claim 2, wherein said one or more parameters are selected from a group consisting of an average historical cost, a median historical cost, and a mean historical cost, as based upon historical trend data for each of said services point associated with said received service point data.

5. The rate structuring system of claim 1, wherein profit data is calculated in (C) and wherein:
  if said profit data is greater than said one or more parameters, said adjustment is a decrease of said rate data; and
  if said profit data is less than said one or more parameters, said adjustment is an increase of said rate data.

6. The rate structuring system of claim 5, wherein said one or more parameters are selected from a group consisting of an average cost for all service points across said geographical area, a median cost for all service points across said geographical area, and a mean cost for all service points across said geographical area.

7. The rate structuring system of claim 5, wherein said one or more parameters are selected from a group consisting of an average historical cost, a median historical cost, and a mean historical cost, as based upon historical trend data for each of said services point associated with said received service point data.

8. The rate structuring system of claim 1, wherein each said at least one service points are discreet mailing addresses assigned to said single zip-code area.

9. The rate structuring system of claim 1, wherein said one or more real-time observed characteristics associated with delivery of at least one package to said at least one service points within said geographical area are selected from a group consisting of: density characteristics, access characteristics, equipment usage characteristics, personnel usage characteristics, fuel usage characteristics, package delivery volume characteristics, package delivery frequency characteristics, and time characteristics.

10. The rate structuring system of claim 1, wherein said service point data comprises one or more real-time observed characteristics associated with at least two service points within said geographical area and said one or more parameters against which said cost and profit data is compared is relative cost and profit data across said at least two service points.

11. The rate structuring system of claim 1, wherein said automatic implementation of said adjustment to said rate data is configured as an immediate implementation of an entirety of said adjustment.

12. The rate structuring system of claim 1, wherein said automatic implementation of said adjustment to said rate data is configured to occur as a periodic implementation of an entirety of said adjustment over an extended period of time.

13. The rate structuring system of claim 1, wherein said service point data is received by said one or more computer processors via one or more handheld devices carried by one or more delivery personnel tasked with delivery of said one or more packages at said at least one service point within said geographical area.

14. The rate structuring system of claim 1, wherein said one or more processors are further configured to apply one or more discounts to said rate adjustment instructions and to generate one or more real-time quotes based at least in part thereon for transmission to a user of the system.

15. The rate structuring system of claim 1, wherein said one or more processors are further configured to apply one or more discounts to said rate adjustment instructions and to generate one or more aggregate pricing bids based at least in part thereon for transmission to a user of the system.

16. A non-transitory computer program product comprising at least one computer-readable storage medium having computer-readable program code portions embodied therein, the computer-readable program code portions comprising:
  (A) a first executable portion configured for receiving and storing a plurality of data, wherein said data comprises:
  (i) rate data comprising existing rates for delivery of packages to each discrete one of said at least one service points within said geographical area, said geographical area corresponding to an area having a single zip-code;
  (ii) one or more pre-determined parameters associated with said geographical area; and
  (iii) service point data comprising one or more real-time observed characteristics associated with delivery of at least one package to one or more of said at least one service points within said geographical area;
  (B) a second executable portion configured for calculating at least one of cost data or profit data for each service point associated with said received service point data;
  (C) a third executable portion configured for comparing said calculated at least one of cost data or profit data against said one or more pre-determined parameters;

(D) a fourth executable portion configured for, in response to at least a portion of said calculated data differing from at least one of said one or more parameters, automatically based thereon generating rate adjustment instructions, said instructions being configured for facilitating automatic implementation of an adjustment to said rate data for each service point associated with said received service point data; and (E) a fifth executable portion configured for, upon generation of said rate adjustment instructions, automatically transmitting said rate adjustment instructions to at least one or more shipping request systems associated with and distinct from said rate structuring system for automatic implementation of said adjustment to said rate data so as to ensure said one or more users are presented with and incur updated rate data based upon a rate schedule incorporating said adjustment for each service point associated with said received service point data.

17. The non-transitory computer program product of claim 16, wherein:
said third executable portion is configured for comparing cost data to said one or more parameters; and
said fourth executable portion is configured for:
in response to said cost data being greater than said one or more parameters, generate rate adjustment instructions configured for implementation of an increase of said rate data; and
in response to said cost data being less than said one or more parameters, generate rate adjustment instructions configured for implementation of a decrease of said rate data.

18. The non-transitory computer program product of claim 16, wherein:
said third executable portion is configured for comparing profit data to said one or more parameters; and
said fourth executable portion is configured for:
in response to said profit data being greater than said one or more parameters, generate rate adjustment instructions configured for implementation of a decrease of said rate data; and
in response to said profit data being less than said one or more parameters, generate rate adjustment instructions configured for implementation of an increase of said rate data.

19. The non-transitory computer program product of claim 16, wherein said one or more parameters are selected from a group consisting of: an average cost, a median cost, a mean cost, a historical cost, an average profit, a median profit, a mean profit, and a historical profit.

20. The non-transitory computer program product of claim 16, wherein each said at least one service points are discreet mailing addresses assigned to said single zip-code area.

21. The non-transitory computer program product of claim 16, wherein said service point data comprises one or more real-time observed characteristics associated with at least two service points within said geographical area and said one or more parameters against which said cost and profit data is compared is relative cost and profit data across said at least two service points.

22. The non-transitory computer program product of claim 16, wherein said service point data is received by said one or more computer processors via one or more handheld devices carried by one or more delivery personnel tasked with delivery of said one or more packages at said at least one service point within said geographical area.

23. The non-transitory computer program product of claim 16, wherein the sixth executable portion is further configured for applying one or more discounts to said rate adjustment instructions and for generating one or more real-time quotes based at least in part thereon for transmission to one or more users of the system.

24. The non-transitory computer program product of claim 16, wherein the sixth executable portion is further configured for applying one or more discounts to said rate adjustment instructions and for generating one or more aggregate pricing bids based at least in part thereon for transmission to a user of the system.

25. A computer-implemented method for determining a rate adjustment for at least one service point within a geographical area, the method comprising the steps of:
(A) receiving and storing service point data within one or more memory storage areas, said service point data comprising one or more real-time observed characteristics associated with delivery of at least one package to one or more of said at least one service points within said geographical area;
(B) retrieving from the one or more memory storage areas at least a portion of existing rate data, the existing rate data comprising existing rates for delivery of packages to each discrete one of said at least one service points within said geographical area, said geographical area corresponding to an area having a single zip-code;
(C) calculating, via at least one computer processor, at least one of cost data or profit data for each service point associated with said received service point data;
(D) comparing, via said at least one computer processor, said calculated at least one of cost data or profit data against one or more parameters contained in the one or more memory storage areas; and
(E) in response to at least a portion of said calculated data differing from at least one of said one or more parameters, automatically based thereon generate rate adjustment instructions, said instructions being configured for facilitating automatic implementation of an adjustment to said rate data for each service point associated with said received service point data; and
(F) upon generation of said rate adjustment instructions, automatically transmit said rate adjustment instructions to at least one or more shipping request systems associated with and distinct from said rate structuring system for automatic implementation of said adjustment to said rate data so as to ensure said one or more users are presented with and incur updated rate data based upon a rate schedule incorporating said adjustment for each service point associated with said received service point data.

* * * * *